(12) United States Patent
Joyner et al.

(10) Patent No.: US 11,102,192 B2
(45) Date of Patent: Aug. 24, 2021

(54) HARVESTING AND DISTRIBUTING A CERTIFICATE BASED ON A DNS NAME

(71) Applicant: ZixCorp Systems, Inc., Dallas, TX (US)

(72) Inventors: Bryan Adam Joyner, Plano, TX (US); Kelly Sue Morrison, Dallas, TX (US); David Joseph Robertson, Richardson, TX (US)

(73) Assignee: ZIXCORP SYSTEMS, INC., Dallas, TX (US)

( * ) Notice: Subject to any disclaimer, the term of this patent is extended or adjusted under 35 U.S.C. 154(b) by 454 days.

(21) Appl. No.: 15/896,569

(22) Filed: Feb. 14, 2018

(65) Prior Publication Data
US 2019/0253410 A1 Aug. 15, 2019

(51) Int. Cl.
*H04L 29/06* (2006.01)
*H04L 9/32* (2006.01)
*H04L 29/12* (2006.01)

(52) U.S. Cl.
CPC ........ *H04L 63/0823* (2013.01); *H04L 9/3263* (2013.01); *H04L 61/1511* (2013.01); *H04L 63/0428* (2013.01); *H04L 63/062* (2013.01)

(58) Field of Classification Search
CPC .............. H04L 63/0823; H04L 63/062; H04L 61/1511; H04L 63/0428; H04L 9/3263
See application file for complete search history.

(56) References Cited

U.S. PATENT DOCUMENTS

| | | | |
|---|---|---|---|
| 6,178,443 B1 | 1/2001 | Lin | |
| 8,060,624 B1 * | 11/2011 | McKinney | ............ H04L 51/043 370/254 |
| 2003/0182559 A1 | 9/2003 | Curry | |
| 2004/0088646 A1 * | 5/2004 | Yeager | .................... H04L 67/04 715/229 |
| 2004/0139314 A1 | 7/2004 | Cook et al. | |
| 2006/0018445 A1 | 1/2006 | Mittal | |
| 2008/0195664 A1 | 8/2008 | Maharajh | |
| 2009/0100263 A1 | 4/2009 | Leonard | |

(Continued)

FOREIGN PATENT DOCUMENTS

EP 3223496 A1 9/2017

OTHER PUBLICATIONS

European Patent Office: Extended European Search Report issued in European Patent Application No. EP 19151705.1, dated Jun. 28, 2019.

(Continued)

*Primary Examiner* — Michael R Vaughan
(74) *Attorney, Agent, or Firm* — Baker Botts L.L.P.

(57) ABSTRACT

According to certain embodiments, a delivery manager comprises an interface and processing circuitry. The interface is configured to receive a certificate that a Domain Name Service (DNS) associates with a DNS name of a recipient system. The processing circuitry is configured to distribute the certificate to a plurality of sending systems. Each sending system is configured to store the certificate in a local memory of the sending system, use the certificate from the local memory of the sending system to perform encryption in response to a future determination to send an encrypted message to the recipient system, and send the encrypted message directly to the recipient system.

19 Claims, 14 Drawing Sheets

(56) References Cited

U.S. PATENT DOCUMENTS

| | | | |
|---|---|---|---|
| 2010/0299522 A1 | 11/2010 | Khambete | |
| 2012/0042161 A1 | 2/2012 | Brown | |
| 2012/0054497 A1* | 3/2012 | Korhonen | H04W 12/0609 713/179 |
| 2012/0117385 A1 | 5/2012 | Bryson | |
| 2012/0124369 A1* | 5/2012 | Amenedo | H04L 63/062 713/156 |
| 2013/0055368 A1 | 2/2013 | Bauckman et al. | |
| 2013/0173795 A1* | 7/2013 | McPherson | H04L 41/50 709/225 |
| 2014/0101775 A1 | 4/2014 | Cheung | |
| 2014/0168453 A1 | 6/2014 | Shoemake | |
| 2014/0208391 A1 | 7/2014 | Farnsworth | |
| 2015/0149585 A1 | 5/2015 | Zhang | |
| 2015/0156172 A1 | 6/2015 | Nandi | |
| 2015/0201002 A1 | 7/2015 | Joyner et al. | |
| 2015/0372821 A1* | 12/2015 | Deschenes | H04L 9/3268 713/176 |
| 2017/0272467 A1* | 9/2017 | Osterweil | H04L 63/20 |
| 2017/0279617 A1* | 9/2017 | Blinn | H04L 9/3247 |
| 2017/0339130 A1 | 11/2017 | Reddy et al. | |
| 2020/0358652 A1* | 11/2020 | Joyner | H04L 41/0889 |

OTHER PUBLICATIONS

European Patent Office Communication and Search Report; Application No. 14193493.5—1958; 10 pages, dated May 7, 2015.

Anonymous, "Revision control"XP055186038, retrieved from Internet: URL: http://en.wikipedia.org/w/index.php?title=Revision_control &oldid=589765566 [retrieved on Apr. 27, 2015], Jan. 8, 2014.

Anonymous: Replication (computing)—XP055167656; retrieved from the Internet: URP:http://en.wikipedia.org/w/index.php?title= Replication_%28computing%29&oldid587233222; [retrieved Feb. 5, 2015], Dec. 22, 2013.

European Patent Office: Summons to attend oral proceedings pursuant to Rule 115(1)EPC, dated Mar. 3, 2017; reveived Mar. 14, 2017.

Coomunication Pursuant to Article 94(3) EPC in EP Application No. 14 193 493.5—1958, dated Apr. 29, 2016 (received May 10, 2016) 8 pages.

Bryan Adam Joyner, et al. Patent Application entitled "Harvesting and Distributing a Certificate based on a DNS Name" U.S. Appl. No. 15/896,655, filed Feb. 14, 2018, 70 pages.

Decision to refuse a European Patent application in Application No. 14 193 493.5-1958, dated Aug. 8, 2017, 20 pages.

* cited by examiner

HARVESTING AND DISTRIBUTING A CERTIFICATE BASED ON A DNS NAME

FIELD OF THE INVENTION

Certain embodiments of the present disclosure relate, in general, to certificates that may be used for securing computing systems and, more specifically, to harvesting and/or distributing a certificate based on a Domain Name System (DNS) name.

BACKGROUND

In a computer network, a sender may transmit files, email messages, and other data to a recipient. The sender may encrypt the data to increase security in some circumstances. As an example, the sender may encrypt the data using a public key encryption technique. In public key encryption, two separate keys are associated with the recipient, a public key and a corresponding private key. The sender obtains the recipient's public key, encrypts the data using the public key, and transmits the encrypted data to the recipient. The recipient decrypts the encrypted data using its corresponding private key.

SUMMARY

According to certain embodiments, disclosed is a delivery manager, a method for use in a delivery manager, and a non-transitory computer readable medium comprising logic for execution by a delivery manager. The delivery manager, method, and/or logic are configured to distribute a certificate. For example, according to a first type of embodiments, a certificate associated with a recipient system is distributed to a plurality of sending systems so that the sending systems can send encrypted messages to the recipient system. According to a second type of embodiments, a certificate associated with a first endpoint may be distributed to a plurality of other endpoints so that transport layer security can be established for a connection between the first endpoint and one of the other endpoints. Examples of the first and second types of embodiments are further summarized below. For simplicity, the first and second types of embodiments are summarized separately. However, the delivery manager, method, and/or logic can be configured to support both types of embodiments.

With respect to the first type of embodiments, according to certain embodiments, a delivery manager comprises an interface and processing circuitry. The interface is configured to receive a certificate that a Domain Name Service (DNS) associates with a DNS name of a recipient system. The processing circuitry is configured to distribute the certificate to a plurality of sending systems. Each sending system is configured to store the certificate in a local memory of the sending system, use the certificate from the local memory of the sending system to perform encryption in response to a future determination to send an encrypted message to the recipient system, and send the encrypted message directly to the recipient system.

According to certain embodiments, a method for use in a delivery manager comprises receiving a certificate that a DNS associates with a DNS name of a recipient system. The method distributes the certificate to a plurality of sending systems. Each sending system is configured to store the certificate in a local memory of the sending system, use the certificate from the local memory of the sending system to perform encryption in response to a future determination to send an encrypted message to the recipient system, and send the encrypted message directly to the recipient system.

According to certain embodiments, a non-transitory computer readable medium stores logic that, when executed by processing circuitry of a delivery manager, is operable to cause the delivery manager to perform actions. The actions comprise receiving a certificate that a DNS associates with a DNS name of a recipient system and distributing the certificate to a plurality of sending systems. Each sending system is configured to store the certificate in a local memory of the sending system, use the certificate from the local memory of the sending system to perform encryption in response to a future determination to send an encrypted message to the recipient system, and send the encrypted message directly to the recipient system.

Each of the above-described delivery manager, method, and logic may include one or more additional features, such as one or more of the following:

According to certain embodiments, the DNS name of the recipient system corresponds to an individual mail client.

According to certain embodiments, the DNS name of the recipient system corresponds to a mail transfer agent.

According to certain embodiments, the certificate is received from a first sending system of the plurality of sending systems. The first sending system configured to obtain the certificate from the DNS in real-time when sending a message to the recipient system for which the first sending system does not have the certificate, and to provide the certificate to the delivery manager for distribution to the other sending systems.

According to certain embodiments, the delivery manager/method/logic sends a request message from the delivery manager to the DNS. The request message requests the certificate associated with the DNS name of the recipient system. The certificate is received as a result of sending the request message. In some embodiments, the request message is sent according to DNS-based Authentication of Named Entities (DANE) protocol.

Certain embodiments include initiating a discovery procedure such that the request message is sent to the DNS without requiring the recipient system to inform the delivery manager that the certificate exists.

According to certain embodiments, the request message from the delivery manager to the DNS is sent in response to a determination that the sending system failed to send the encrypted message directly to the recipient system. The determination that the sending system failed to send the encrypted message directly to the recipient system can be made based on data reported from the sending system.

According to certain embodiments, the recipient system is notified in response to the delivery manager determining that there is a problem with the certificate received from the DNS.

According to certain embodiments, an invitation message is sent to the recipient system. The invitation message invites the recipient system to become a member of the plurality of sender systems. According to certain embodiments, the delivery manager maintains a certificate repository comprising other certificates associated with other recipient systems. In response to the recipient system becoming a member of the plurality of sender systems, the other certificates are distributed to the recipient system.

Certain embodiments further comprise receiving a current certificate that the DNS associates with the DNS name of the recipient system, determining that the current certificate differs from the previous certificate, and distributing the current certificate to the plurality of sending systems. The current certificate can be obtained by periodically sending request messages to the DNS. The request messages request the current certificate associated with the DNS name of the recipient system.

According to certain embodiments, the certificate is distributed to the plurality of sending systems according to a pre-determined time period. In some embodiments, the certificate is made available to the plurality of sending systems concurrently.

According to certain embodiments, the certificate comprises a key identifier, a public key, information about a version, and/or a signature.

According to certain embodiments, distributed file version management technology is used to distribute the certificate to the sending systems.

With respect to the second type of embodiments, according to certain embodiments, a delivery manager comprises an interface and processing circuitry. The interface is configured to receive a certificate that a DNS associates with a DNS name of a first endpoint. The processing circuitry is configured to distribute the certificate to a second endpoint. The second endpoint is configured to store the certificate in a local memory of the second endpoint and, in response to a future determination to establish a connection with the first endpoint, use the certificate from the local memory of the second endpoint to establish transport layer security (TLS) for the connection.

According to certain embodiments, a method for use in a delivery manager comprises receiving a certificate that a DNS associates with a DNS name of a first endpoint and distributing the certificate to a second endpoint. The second endpoint is configured to store the certificate in a local memory of the second endpoint and, in response to a future determination to establish a connection with the first endpoint, use the certificate from the local memory of the second endpoint to establish transport layer security (TLS) for the connection.

According to certain embodiments, a non-transitory computer readable medium stores logic that, when executed by processing circuitry of a delivery manager, is operable to cause the delivery manager to perform actions. The actions comprise receiving a certificate that a DNS associates with a DNS name of a first endpoint and distributing the certificate to a second endpoint. The second endpoint is configured to store the certificate in a local memory of the second endpoint and, in response to a future determination to establish a connection with the first endpoint, use the certificate from the local memory of the second endpoint to establish transport layer security (TLS) for the connection.

Each of the above-described delivery manager, method, and logic associated with may include one or more additional features, such as one or more of the following:

According to certain embodiments, the DNS name of the first endpoint corresponds to an individual mail client.

According to certain embodiments, the DNS name of the first endpoint corresponds to a mail transfer agent.

According to certain embodiments, the certificate is received from a third endpoint. The third endpoint is configured to obtain the certificate from the DNS and provide the certificate to the delivery manager for distribution to other endpoints. For example, the third endpoint can obtain the certificate from the DNS in real-time when establishing a TLS connection to the first endpoint for which the third endpoint does not have the certificate.

According to certain embodiments, a request message is sent from the delivery manager to the DNS. The request message requests the certificate associated with the DNS name of the first endpoint. The certificate is received as a result of sending the request message. In some embodiments, the request message is sent according to DNS-based Authentication of Named Entities (DANE) protocol.

According to some embodiments, a discovery procedure is initiated such that the request message is sent to the DNS without requiring the first endpoint to inform the delivery manager that the certificate exists.

According to certain embodiments, the request message is sent in response to a determination that the second endpoint failed to establish TLS for the connection with the first endpoint. The determination that the second endpoint failed to establish TLS for the connection with the first endpoint can be made based on data reported from the second endpoint.

According to certain embodiments, the first endpoint is notified in response to the delivery manager determining that there is a problem with the certificate received from the DNS.

According to certain embodiments, an invitation message is sent to the first endpoint. The invitation message invites the first endpoint to become a member of a network comprising a plurality of endpoints. In response to the first endpoint becoming a member of the network, other certificates associated with other endpoints can be distributed from a certificate repository maintained by the delivery manager to the first endpoint.

Certain embodiments receive a current certificate that the DNS associates with the DNS name of the first endpoint. In response to determining that the current certificate differs from the previous certificate, the current certificate is distributed to the second endpoint and a plurality of other endpoints.

According to certain embodiments, the current certificate is obtained by periodically sending request messages to the DNS. The request messages request the current certificate associated with the DNS name of the first endpoint.

According to certain embodiments, the certificate is distributed to the second endpoint and a plurality of other endpoints according to a pre-determined time period.

According to certain embodiments, the certificate comprises a key identifier, a public key, information about a version, and/or a signature.

According to certain embodiments, the certificate is made available to a plurality of endpoints concurrently.

According to certain embodiments, distributed file version management technology is used to distribute the certificate to the second endpoint.

Also disclosed is a sending system, a method for use in a sending system, and a non-transitory computer readable medium comprising logic for execution by a sending system. According to certain embodiments, a sending system comprises an interface and processing circuitry. The interface is configured to receive a certificate that a DNS associates with a DNS name of a recipient system. The certificate is received from the DNS or from a delivery manager located remotely from the sending system. The processing circuitry is configured to provide the certificate to the delivery manager (e.g., for distribution to other sending systems) in response to a determination that the certificate was received form the DNS. The processing circuitry is operable to store the certificate in a local memory of the sending system and, in response to a future determination to send an encrypted message to the recipient system, use the certificate from the local memory of the sending system to perform encryption. The processing circuitry is operable to send the encrypted message directly to the recipient system.

According to certain embodiments, a method for use in a sending system comprises receiving a certificate that a DNS associates with a DNS name of a recipient system. The certificate is received from the DNS or from a delivery manager located remotely from the sending system. The method comprises, in response to a determination that the certificate was received form the DNS, providing the certificate to the delivery manager for distribution to other sending systems. The method comprises storing the certificate in a local memory of the sending system and, in response to a future determination to send an encrypted message to the recipient system, using the certificate from the local memory of the sending system to perform encryption. The method comprises sending the encrypted message directly to the recipient system.

According to certain embodiments, a non-transitory computer readable medium storing logic that, when executed by processing circuitry of a sending system, is operable to cause the sending system to perform actions. The actions comprise receiving a certificate that a DNS associates with a DNS name of a recipient system. The certificate is received from the DNS or from a delivery manager located remotely from the sending system. The actions comprise, in response to a determination that the certificate was received form the DNS, providing the certificate to the delivery manager for distribution to other sending systems. The actions comprise storing the certificate in a local memory of the sending system and, in response to a future determination to send an encrypted message to the recipient system, using the certificate from the local memory of the sending system to perform encryption. The actions comprise sending the encrypted message directly to the recipient system.

Each of the above-described sending system, method, and logic may include one or more additional features, such as one or more of the following:

According to certain embodiments, the DNS name of the recipient system corresponds to an individual mail client.

According to certain embodiments, the DNS name of the recipient system corresponds to a mail transfer agent.

According to certain embodiments, the sending system/method/logic determines that the sending system does not have the certificate required to encrypt a message to the recipient system and requests the certificate from the DNS in real-time when sending the message to the recipient system. In some embodiments, the request message is sent according to DNS-based Authentication of Named Entities (DANE) protocol.

According to certain embodiments, a current certificate that the DNS associates with the DNS name of the recipient system is received and a determination is made that the current certificate differs from the previous certificate. The current certificate is then provided to the delivery manager for distribution to the plurality of sending systems.

According to certain embodiments, the certificate comprises a key identifier, a public key, information about a version, and/or a signature.

According to certain embodiments, updated certificates are periodically requested from the DNS or the delivery manager according to a pre-determined time period.

According to certain embodiments, distributed file version management technology is used to receive the certificate from the delivery manager.

Also disclosed are first and second endpoints, a method for use in the second endpoint, and a non-transitory computer readable medium comprising logic the execution by the second endpoint. The second endpoint/method/logic is configured to receive a certificate that a DNS associates with a DNS name of the first endpoint. The certificate is received from the DNS or from a delivery manager located remotely from the second endpoint. In response to a determination that the certificate was received from the DNS, the second endpoint/method/logic is configured to provide the certificate to the delivery manager for distribution to other endpoints. The second endpoint/method, logic is further configured to store the certificate in a local memory of the second endpoint and, in response to a future determination to establish a connection with the first endpoint, use the certificate from the local memory of the second endpoint to establish TLS for the connection.

The above-described second endpoint/method/logic may include one or more additional features, such as one or more of the following:

According to certain embodiments, the DNS name of the first endpoint corresponds to an individual mail client.

According to certain embodiments, the DNS name of the first endpoint corresponds to a mail transfer agent.

According to certain embodiments, the second endpoint/method/logic determines that the second endpoint does not have the certificate required to establish TLS for the connection to the first endpoint and requests the certificate from the DNS in real-time when establishing the connection to the first endpoint. In some embodiments, the request message is sent according to DNS-based Authentication of Named Entities (DANE) protocol.

According to certain embodiments, a current certificate that the DNS associates with the DNS name of the first endpoint is received and a determination is made that the current certificate differs from the previous certificate. The current certificate is then provided to the delivery manager for distribution to a plurality of other endpoints.

According to certain embodiments, the certificate comprises a key identifier, a public key, information about a version, and/or a signature.

According to certain embodiments, updated certificates are periodically requested from the DNS or the delivery manager according to a pre-determined time period.

According to certain embodiments, distributed file version management technology is used to receive the certificate from the delivery manager.

Some embodiments of the disclosure may provide one or more technical advantages. A technical advantage of certain embodiments may be efficient management of a certificate within a network. For example, a recipient's certificate may be distributed to senders and stored in local memory associated with each sender. When a sender needs to send an encrypted message to the recipient, the sender can use the recipient's certificate stored in local memory without having to ask a remote resource, such as a central server or the recipient itself, for the certificate. Thus, certain embodiments may reduce or eliminate latencies and/or bandwidth penalties associated with having to ask a remote resource for the certificate at the time the sender needs to send the encrypted message to the recipient. Additionally, storing certificates in local memory may allow the sender to access and apply the certificate during a temporary absence of the remote resource. In some embodiments, storing the certificate in local memory may reduce or eliminate race conditions that would otherwise occur if a process was required to obtain the certificate from a remote resource (and therefore incur delays) each time the certificate was needed.

An advantage of certain embodiments allows for obtaining certificates from DNS. For example, in the event that members of a system do not have any certificate for a recipient system or endpoint, the certificate can be obtained from DNS without having to depend on the recipient system or endpoint to provide its certificate directly to the members of the system. In certain situations, this may allow the certificate to be obtained more quickly.

An advantage of certain embodiments allows for reducing certificate queries to DNS. For example, a delivery manager may distribute the certificate obtained from DNS to member systems so that each individual member of the system need not send a query requesting the same certificate from DNS.

An advantage of certain embodiments allows for periodically harvesting updated certificates from DNS and distributing the updated certificates to the member systems. This may help to ensure that member systems have up-to-date certificates for recipient systems or endpoints in advance, which in turn may help to avoid latencies in the future when the member system needs to use the certificate to communicate with the recipient system or endpoint.

An advantage of certain embodiments allows for detecting a problem with a certificate obtained from DNS and notifying the owner of the certificate of the problem.

An advantage of certain embodiments allows for inviting a recipient system or endpoint to become a member of a system in order to receive a repository of certificates associated with other systems or endpoints (which may help to avoid latencies in the future when the recipient system needs to use the certificate to communicate with the other systems or endpoints).

An advantage of certain embodiments includes the ability to manage various types of certificates, such as certificates used to encrypt e-mail messages and/or certificates used to secure a connection (e.g., TLS certificate). For simplicity, certain advantages have been described with respect to e-mail certificates. It will be understood by those of ordinary skill in the art that embodiments using other types of certificates may provide analogous advantages.

Some embodiments may benefit from some, none, or all of these advantages. Other technical advantages may be readily ascertained by one of ordinary skill in the art.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1A:
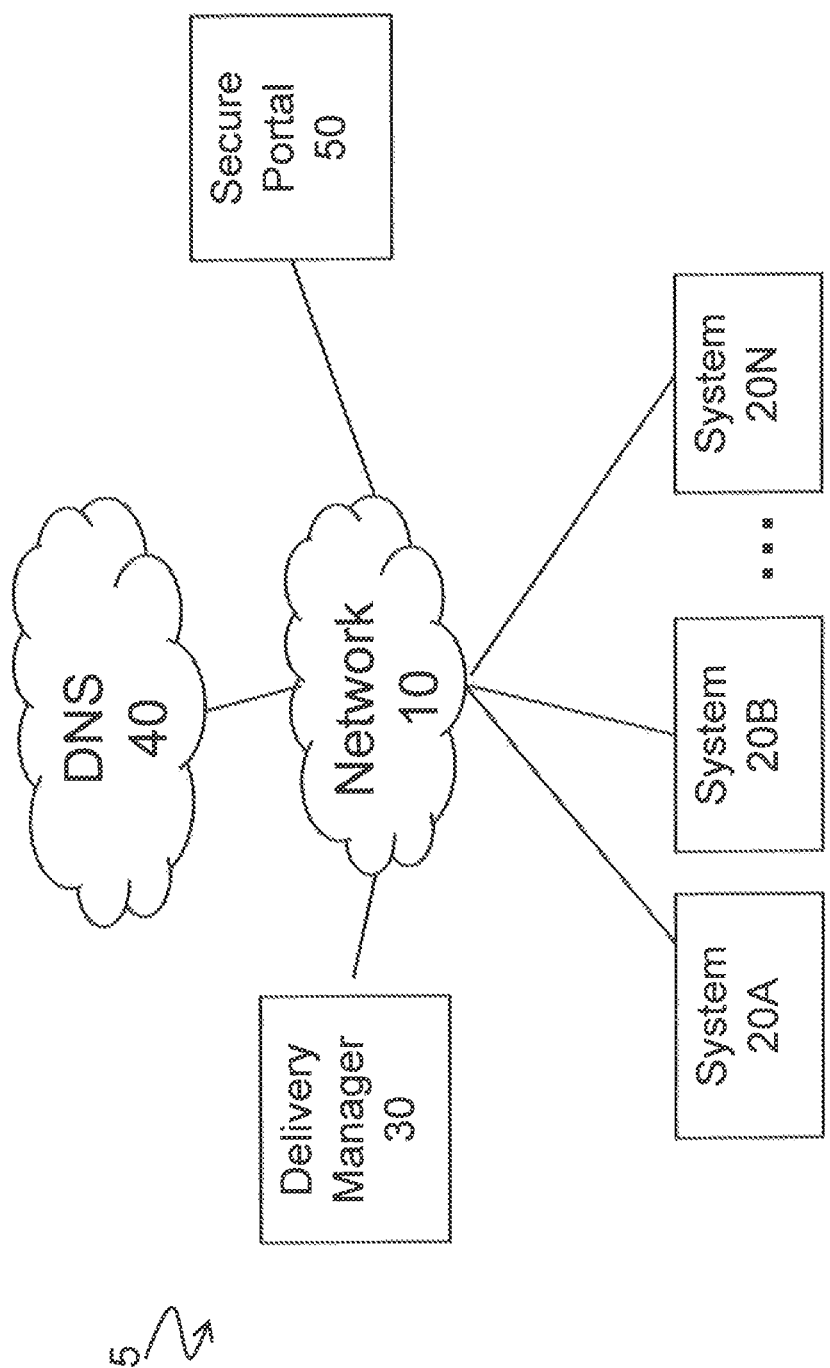
FIG. 1A illustrates an example of a system for distributing a certificate, according to certain embodiments.

Embodiments of the present invention are described in FIGS. 1-13 of the drawings, like numerals being used for like and corresponding parts of the various drawings.

In a computer network, a sender may transmit files, email messages, and other data to a recipient. The sender may encrypt the data to increase security in some circumstances. As an example, the sender may encrypt the data using a public key encryption technique. In public key encryption, two separate keys are associated with the recipient, a public key and a corresponding private key. The sender Obtains the recipient's public key, encrypts the data using the public key, and transmits the encrypted data to the recipient. The recipient decrypts the encrypted data using its corresponding private key.

A recipient's public key can be communicated in a certificate. For example, the certificate may include information about the public key, information about the identity of the recipient, and the digital signature of an entity that has verified the certificate. To ensure that the sender has an up-to-date certificate, conventional systems may require the sender to request the recipient's certificate from a remote resource (e.g., a central storage facility or the recipient itself) each time the sender wishes to transmit data to the recipient. Requesting the certificate from a remote resource introduces delay and consumes internet access bandwidth. Additionally, the certificate may become temporarily unavailable to the sender if the sender gets disconnected from the remote resource. Embodiments of the present disclosure may provide solutions to these and other problems.

In some embodiments, a certificate associated with a recipient can be made available (concurrently) to a broad population of message/content senders. Thus, encryption can be performed by each sender on a message-by-message basis without per-message communication back to the recipient or a central storage facility.

In some embodiments, a central storage facility houses accurate reference copies of certificates for all recipients, network-wide. Full copies of the entire certificate store may then be conveyed to all of the senders (e.g., sending entities) in the network and maintained as 'local stored cache' representations of the recipient certificates. After that, the central storage facility communicates recipient certificates to the senders only occasionally as may be required to keep the local copies current. For example, if an addition, deletion, or modification is made to the reference copy of a recipient certificate stored in the central storage facility, the addition, deletion, or modification may be communicated to the senders without having to communicate any unchanged recipient certificates. If each sender maintains efficiently managed 'local caches' of all recipient certificates needed to transmit data to any recipient on the network, the senders may be able to apply the recipient certificates to messages while conserving network bandwidth and resources associated with retrieving the certificates from a remote resource on a per-message basis.

In some embodiments, the recipient certificates may be stored in a standardized format at every location to enable off-the-shelf distributed file version management technology to be used to keep file copies aligned. In some embodiments, technology that is typically used for source file control in distributed software development environments, such as Git, J/Git, Subversion, Concurrent Versions System (CVS), or ClearCase, may be used as the distributed file version management technology.

In some embodiments, a delivery manager manages the distribution of recipient certificates to sending systems that are members of a certificate distribution network. In some embodiments, the delivery manager obtains the recipient certificates from a domain name service (DNS). For example, a recipient system may publish its certificate to DNS, and the delivery manager may then obtain the recipient certificate from DNS (rather than having to request the certificate from the recipient system). The delivery manager can request/obtain the recipient certificate directly from DNS, or the delivery manager can obtain the recipient certificate from DNS indirectly via one of the members/sending, systems in the certificate distribution network. The delivery manager may then distribute the recipient certificates received directly or indirectly from DNS to the other sending systems. In certain embodiments, delivery manager can be configured to periodically harvest recipient certificates from DNS. For example, if the delivery manager detects that it does not have any DNS certificate for a particular recipient system or if the delivery manager detects that the DNS certificate that it has for the recipient system is expired or otherwise invalid, delivery manager may request the certificate from DNS and may then distribute the certificate to the sending systems.

FIG. 1A illustrates an example of a system 5 for distributing a certificate, according to certain embodiments. In the illustrated example, system 5 includes a network 10 that communicatively couples a plurality of systems 20A-N, a delivery manager 30, a domain name service (DNS) 40, and a secure portal 50.

Systems 20A-N may comprise hardware and/or software and may be capable of both sending and receiving messages. Messages may include address information and/or message information. Address information identifies one or more intended recipients to which the message information is directed. Examples of addresses include an email address, an IP address, a phone number, or other identifier associated with the intended recipient. Message information may include any content to be communicated to the recipient. Examples of message information include data such as a file, the body of an email, or content associated with a web page, such as HTML content, XML instructions, etc, Message information may include text, drawings, photographs, video, audio, etc. In some embodiments, a message may refer to an email.

For a given message, a particular system 20 may be configured as a sending system or a recipient system. As an example, if system 20A were to send a message to system 20B, system 20A would be considered the sending system and system 20B would be considered the recipient system for that message. In certain embodiments, sending system 20A may send a message to recipient system 20B using a certificate associated with recipient system 20B. Sending system 20A may obtain the certificate from delivery manager 30, as further discussed with respect to FIGS. 2-4 below.

Each system 20 may include any suitable combination of hardware and/or software, such as a computing system comprising one or more interfaces, logic, and/or one or more memories, which are described in more detail below. In some embodiments, system 20 may comprise a gateway that manages policy enforcement and/or content delivery on behalf of a plurality of devices associated with a company or other entity. For example, a company may maintain a network through which its employees or customers access company data using laptop computers, desktop computers, mobile phones, and/or other user devices. The gateway may manage policy enforcement and/or content delivery to the user devices that access the company's network. In alternative embodiments, certain policy enforcement may occur at the user device level and system 20 may refer to the user device itself. In some embodiments, system 20 may include an email application. System 20 may be operable to forward messages to a user device and/or to display messages on a display. System 20 may communicate with network 10 via a wired or wireless connection.

Each system 20 may optionally include support for encrypting messages, decrypting messages, and/or communicating messages using a secure connection protocol (e.g., SSL, TLS). Prior to transmitting a message, sending system 20A may determine whether the message requires encryption. The determination may be made based on whether a user has requested encryption or based on a pre-defined rule (such as a rule to encrypt messages to certain recipients, a rule to encrypt messages that include certain keywords, etc).

If the message requires encryption, sending system 20A checks a local cache for one or more certificates associated with recipient system 20B. The local cache includes certificates previously obtained from delivery manager 30, as further discussed with respect to FIGS. 2-4 below. If the local cache includes a certificate that is associated with recipient system 20B and corresponds to a desired encryption technique supported by sending system 20A, sending system 20A encrypts the message accordingly. As an example, the desired encryption technique may correspond to the most secure technique supported by both sides or a preferred encryption technique indicated in a preference associated with recipient system 20B. In some embodiments, the encryption technique may correspond to a public key encryption technique, such as S/MIME (Secure/Multipurpose Internet Mail Extensions), and sending system 20A may determine recipient system 20B's public key from the certificate. Encryption may be applied at any suitable point in the sending path (e.g., by the sending user device or by the sending gateway). Similarly, decryption may be performed at any suitable point in the receiving path (e.g., by the receiving gateway or by the receiving user device).

If sending system 20A's local cache does not include recipient system 20B's certificate for the desired encryption technique, sending system 20A may optionally request the certificate from recipient system 20B in real-time when sending the message to recipient system 20B. If sending system 20A receives the certificate, sending system 20A may use the certificate to send encrypted messages directly to the recipient system 20B. Sending system 20A may also provide the certificate to delivery manager 30 for distribution to other systems 20.

Alternatively, if sending system 20A's local cache does not include recipient system 20B's certificate for the desired encryption technique, sending system 20A may optionally send the message to recipient system 20B indirectly via secure portal 50. For example, secure portal 50 may receive message A encrypted according to a first technique supported by sending system 20A, decrypt message A, encrypt the message according to a second technique supported by recipient system 20B to yield message B, and communicate message B to recipient system 20B. In certain embodiments, sending messages via secure portal 50 prompts delivery manager 30 to harvest recipient system 20B's certificate and distribute to systems 20.

In certain embodiments, delivery manager 30 may include one or more servers. A server may refer to any suitable combination of hardware and/or software implemented in one or more modules to process data and provide the described functions and operations. In some embodiments, the server may include, for example, a mainframe, host computer, data center, workstation, web server, file server, a personal computer such as a laptop, or any other suitable device operable to process data. In some embodiments, the server may execute any suitable operating system such as IBM's zSeries/Operating System (z/OS), MS-DOS, PC-DOS, MAC-OS, WINDOWS, UNIX, OpenVMS, or any other appropriate operating systems, including future operating systems. In some embodiments, delivery manager 30 may comprise a central storage facility that maintains and distributes recipient certificates. In certain embodiments, delivery manager 30 may refer to a distinct component external from systems 20. In other embodiments, functionality of delivery manager 30 could be included in one or more systems 20 (e.g., one system 20 may be configured to distribute certificates to other systems 20).

DNS 40 refers to a domain name service (or domain name system). Certain embodiments of DNS 40 have been specified in industry protocols and have been in use since approximately the 1980s. Thus, a person of ordinary skill in the art would be familiar with conventional aspects of DNS 40. For example, in general, DNS 40 may encompass a distributed/decentralized naming system for computers, services, or other resources connected to the Internet or a private network. DNS 40 associates various information with domain names assigned to each of the participating entities. As an example, DNS 40 may be configured to translate domain names (such as _____.com, _____.org, _____.net, or other domain names) to numerical IP addresses needed for locating and identifying computer services and devices with the underlying network protocols. As another example, DNS 40 may be configured to support DNS-based authentication of named entities (DANE) protocol or other protocols in order to associate domain names with corresponding certificates. For example, a first system may publish its certificate to DNS 40, and another system may request the first system's certificate from DNS 40 in order to be able to send encrypted messages to the first system (e.g., the second system obtains the first system's public key from the certificate received from DNS 40).

In certain embodiments secure portal 50 refers to a secure messaging portal, such as a ZixPort®. For example, in certain embodiments, sending system 20A may send an encrypted message via secure portal 50. Secure portal 50 may decrypt the message and send a notification email to recipient system 20B that links to the message within secure portal 50. After a user of recipient system 20B signs in to an account that secure portal 50 associates with the user (such as a webmail account provided by secure portal 50), the user can view the linked message and any attachments over a secure connection, such as Hypertext Transfer Protocol Secure (HTTPS), Secure Socket Layer (SSL), Transport Layer Security (TLS), or other secure connection.

Communication network 10 may comprise any one or more interconnecting networks for communicatively coupling components of system 5. For example, communication network 10 may comprise all or a portion of one or more of the following: a public snitched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

Figure 1B:
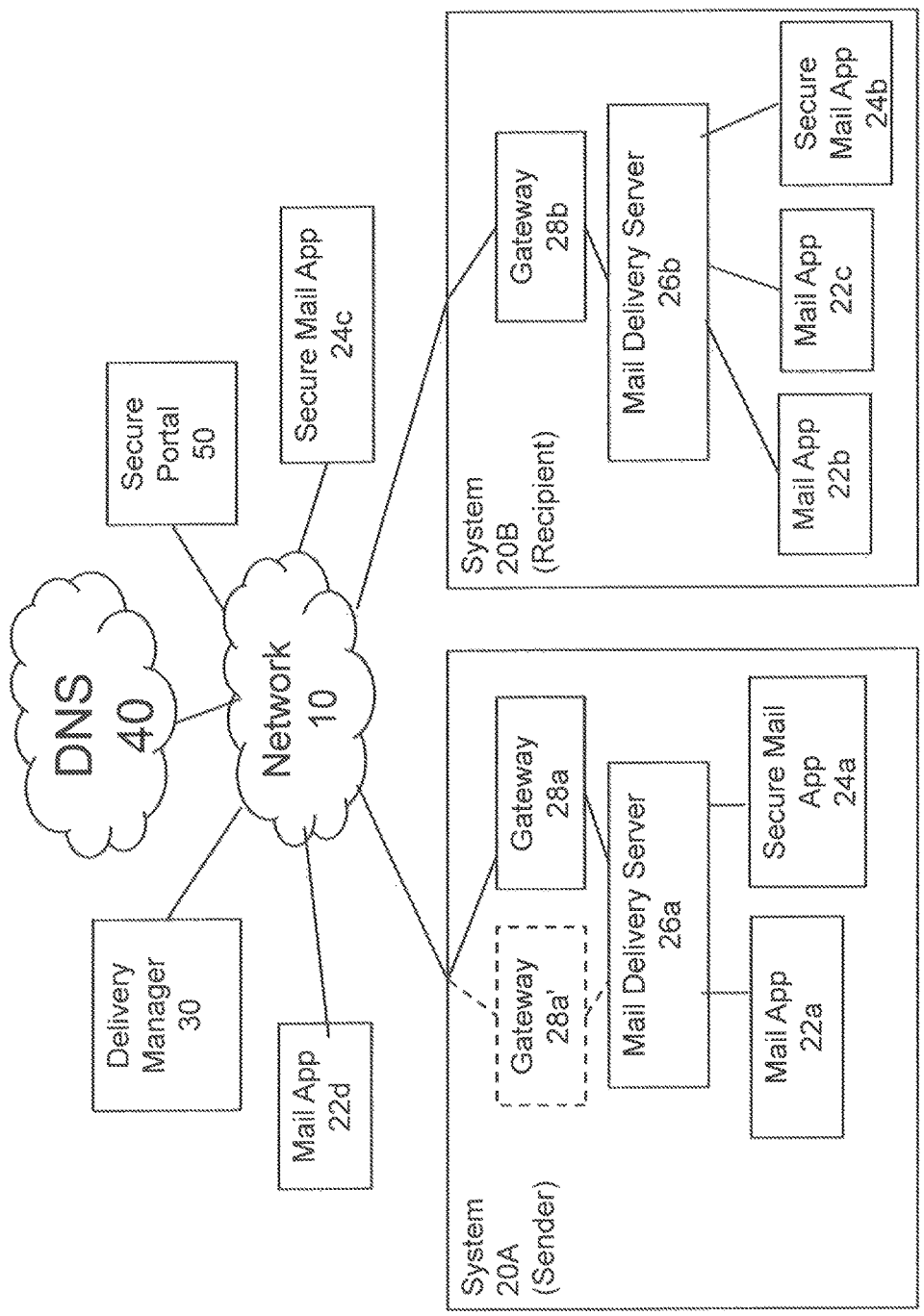
FIG. 1B illustrates an example of a system for delivery of email, according to certain embodiments.

FIG. 1B illustrates an example of a system for delivery of email, in accordance with certain embodiments. The system may include one or more mail applications 22, secure mail applications 24, mail delivery servers 26, and/or gateways 28. Depending on the embodiment, any of mail applications 22, secure mail applications 24, mail delivery servers 26, and/or gateways 28 may perform some or all of the operations described with respect to system 20 (e.g., sending system 20A or recipient system 20B) of FIG. 1A.

Mail application 22 may refer to an application through which a user accesses the user's mailbox in order to compose outbound entails, view inbound emails, and so on. Mail application 22 may run on a user device, such as a laptop computer, desktop computer, mobile phone, etc, Examples of mail application 22 include. Microsoft Outlook®, Lotus Notes®, Google Gmail®, and so on. Secure mail application 24 may be similar to mail application 22 and may include additional security functionality. For example, secure mail application may be able to encrypt and decrypt email. In some embodiments, a secure mail plug-in may be used to add the security functionality to a mail application 22 in order to yield secure mail application 24. Mail applications 22 and 24 may be associated with a mail delivery server 26 and/or gateway 28 (e.g., as shown by mail applications 22a, 24a, 22b, 22c, and 24b of FIG. 1B) or may be standalone (e.g., as shown by mail applications 22d and 24c of FIG. 1B).

Mail delivery server 26 may refer to a server that delivers email to the user's mailbox. As an example, a Microsoft Exchange® server. In some embodiments, mail delivery server 26 may correspond to a particular domain. For example, mail delivery server 26a may correspond to Company A and may deliver entails to and from the domain @CompanyA.com. As illustrated, mail application 22a may correspond to a user within the domain, such as User_1@CompanyA.com, and secure mail application 24a may correspond to another user within the domain, such as User_2@CompanyA.com. Thus, mail delivery server 26a delivers emails to/from User_1@CompanyA.com and emails to/from User_2@CompanyA.com. Mail delivery server 26b may deliver entails within a different domain, such as @CompanyB.com, and may deliver emails to and from mail applications associated with Company B (e.g., as shown in by mail applications 22b and 22c, and secure mail application 24b of FIG. 1B).

Gateway 28 may refer to a mail relay positioned between a private network (such as Company A's network) and an outside network (such as the Internet or Company B's network). In some embodiments, gateway 28 may be positioned at the edge of the private network. As an example, gateway 28a may receive email from mail delivery server 26a, apply policies for sending email to the outside network, and then forward the email to the outside network (e.g., via network 10). Similarly, gateway 28a may receive email from the outside network (e.g., via network 10), apply policies for receiving email from the outside network, and then forward the email to mail delivery server 26a for delivery to the appropriate mailbox. In some embodiments, redundant gateways may be used to provide load balancing, disaster recovery, or other redundancy. For example, gateway 28a' may operate as a redundant gateway for gateway 28a. Gateway 28a and redundant gateway 28a' may each maintain local copies of current certificates so that either gateway is prepared to process email.

Mail applications 22, secure mail applications 24, mail delivery servers 26, and gateways 28 may communicate using a shared protocol, such as Simple Mail Transfer Protocol (SMTP). Using the same protocol may allow for sending the email along any suitable path between any suitable sender and recipient. For example, sending mail application 22 (or 24) may send an email directly to a receiving mail application 22 (or 24), directly to a receiving gateway 28 that facilitates delivery of the email to the receiving mail application 22 (or 24), or to secure portal 50 to facilitate delivery of the email to the receiving mail application 22 (or 24) either directly or via a receiving gateway 28. In the preceding example, sending mail application 22 (or 24) may send the outbound email via a sending gateway 28 (e.g., mail application 22a sends email via sending gateway 28a) or independently of a gateway (e.g., mail application 22d sends email directly to the receiving component, wherein the receiving component could be receiving mail application 22 itself or an intermediate receiving component, such as a gateway 28 associated with receiving mail application 22 or secure portal 50).

In some embodiments, the method of entail delivery may depend on certificate availability. As an example, if gateway 28a possesses a certificate for gateway 28b, a policy may instruct gateway 28a to send email directly to gateway 28b. But, if gateway 28a does not possess a certificate for gateway 28b, the policy may instruct gateway 28a to send email to gateway 28b indirectly via secure portal 50.

Figure 2:
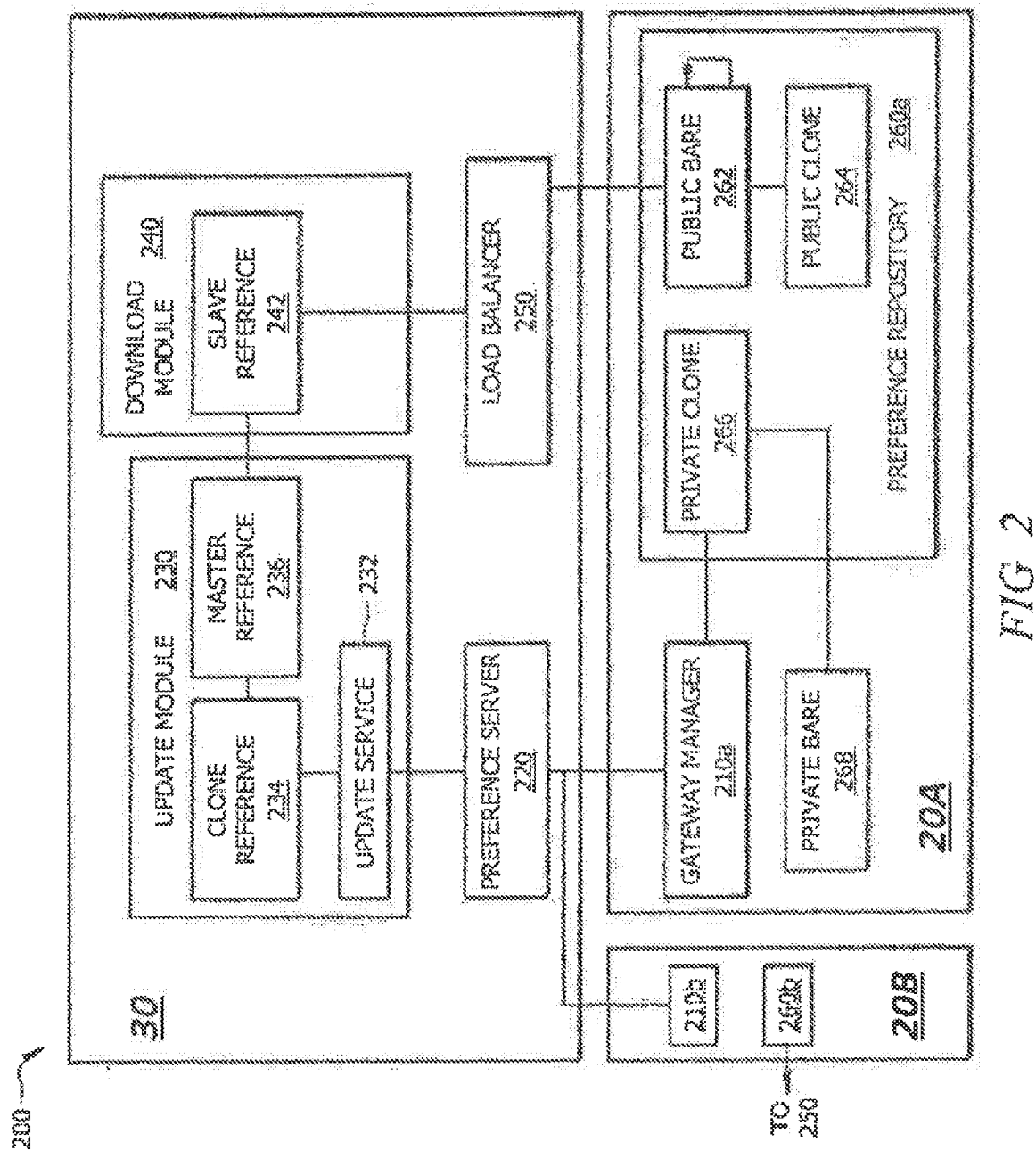
FIG. 2 illustrates an example of components of the system that may facilitate the distribution of certificates, according to certain embodiments.
Figure 3:
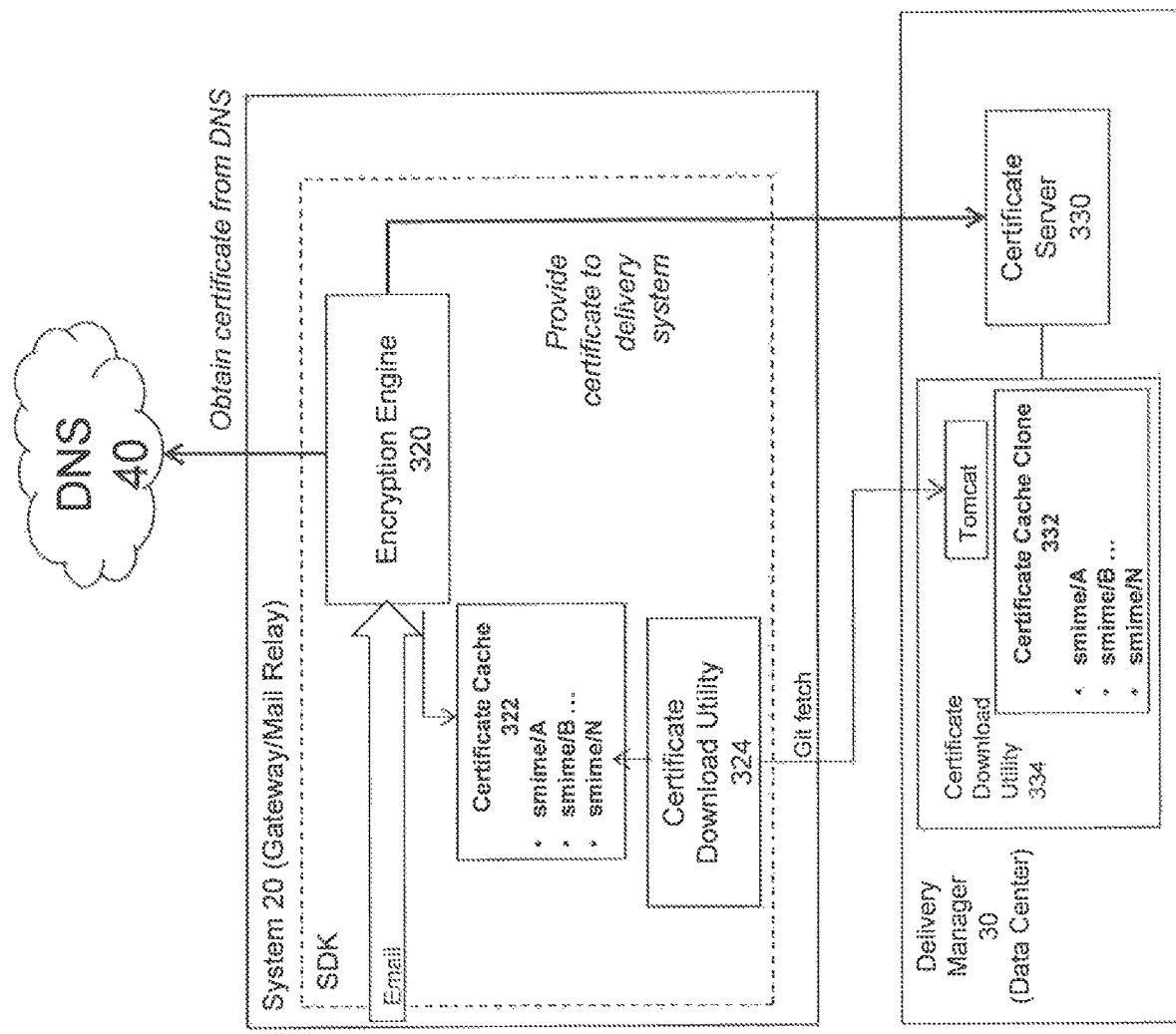
FIG. 3 illustrates an example of components of the system that may facilitate obtaining a certificate from DNS, according to certain embodiments.
Figure 4:
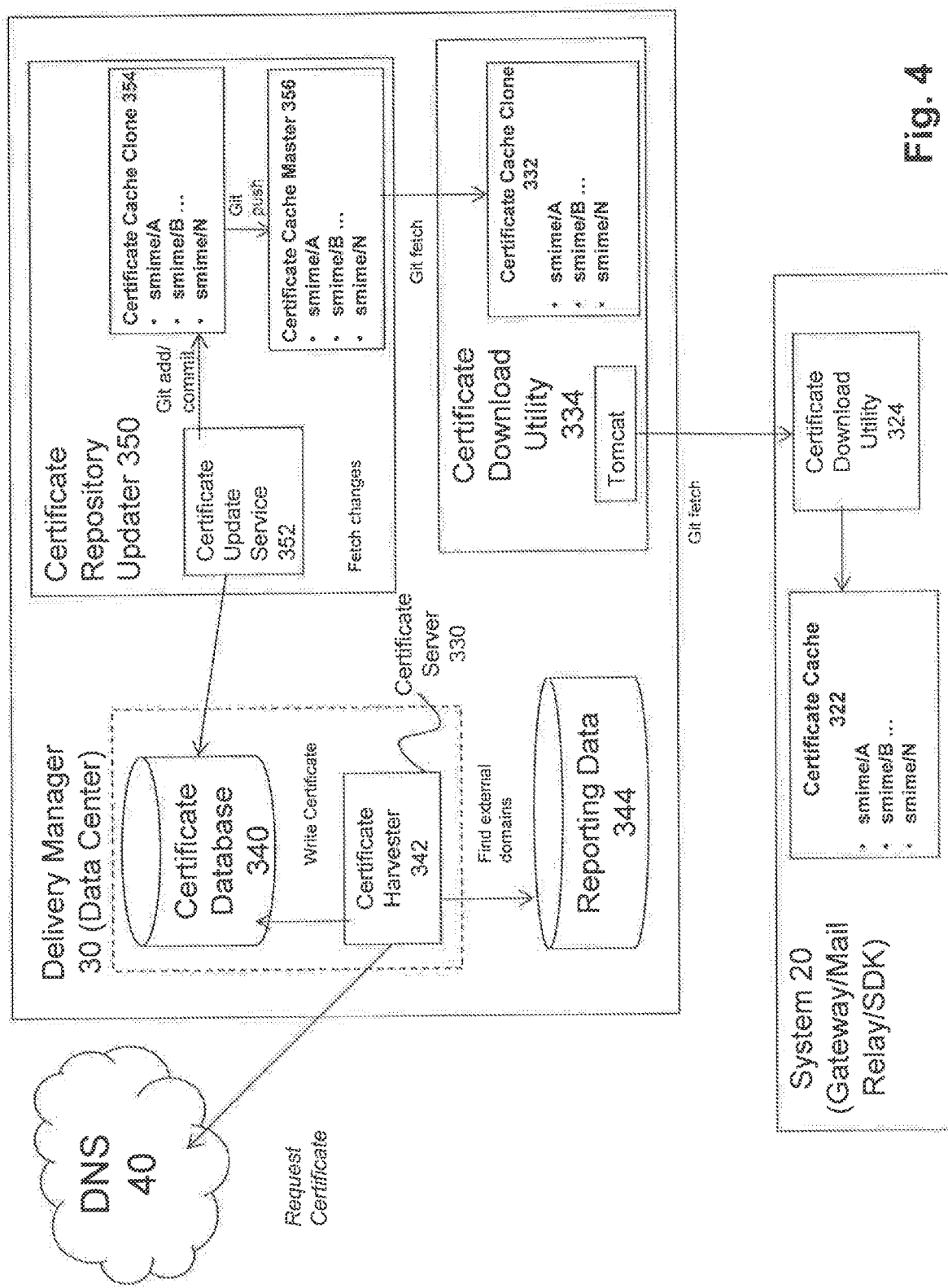
FIG. 4 illustrates an example of components of the system that may facilitate harvesting a certificate from DNS, according to certain embodiments.

Certificates may be distributed to and applied at any suitable point in the email transmission. As an example, certificates may be applied by secure mail application 22, gateway 28, or secure portal 50. FIGS. 2-4 below describe systems and methods for distributing certificates to a system 20, such as gateway 28 or secure mail application 24.

FIG. 2 illustrates an example of components 200 that may facilitate the distribution of certificates within system 5. In the illustrated example, systems 20 each comprise a gateway manager 210 and a preference repository 260, and delivery manager 30 comprises preference server 220, update module 230, download module 240, and load balancer 250. Components 200 may be used to provide one or more preferences of recipient system 20B to sending system 20A.

Recipient preferences indicate how recipient system 20B prefers messages to be delivered to recipient system 20B. As an example, a preference may include one or more certificates associated with recipient system 20B. The certificate may include various attributes, such as a key identifier, a public key, version information, and a signature. Delivery manager 30 may distribute the certificate to each system 20 on the network so that systems 20 sending messages to recipient system 20B can encrypt the data in a manner that recipient system 20E will be able to decrypt using its corresponding private key. S/MIME or any other suitable encryption protocol may be used by systems 20.

To provide sending system 20A with preferences, delivery manager 30 must first receive preferences of recipient system 20B. In the example embodiment of FIG. 2, preference server 220 of delivery manager 30 may receive preferences from gateway manager 210b residing on recipient system 20B. FIGS. 3 and 4, discussed below, illustrate additional methods that can be used by delivery manager 30 to obtain preferences (e.g., certificates) associated with recipient system 20B. Delivery manager 30 may be configured to perform one or more of the techniques of FIGS. 2, 3, and/or 4 in order to obtain the preferences of recipient system 20B.

In some embodiments, preference server 220 comprises an interface to receive preferences recipient system 20B. System 20B may communicate current, up-to-date preferences to preference server 220 in response to an operation that causes preferences to change, such as an add, modify, or remove operation. Logic in preference server 220 may process add, modify, and remove operations and may store current preferences in a preference server database (e.g., a DB2 database) associated with preference server 220.

Preference server 220 may interface with update module 230 residing in delivery manager 30 (e.g., a data center). Update module 230 may comprise an update service 232, a clone reference repository 234, and a master reference repository 236. Update service 232 may receive current preferences from preference server 220 and may interact with clone reference repository 234 and master reference repository 236 to facilitate distributing preferences to systems 20.

In some embodiments, update service 232 may comprise a Java-based web application running inside a Tomcat Servlet container with Apache. Update service 232 may use a distributed file version management technology, such as Git, J/Git, Subversion, Concurrent Versions System (CVS), or ClearCase, to manage the version of the preference (e.g., certificate or other preference) that gets distributed to and stored in the various repositories of delivery manager 30 and systems 20.

Initially, update service 232 may create clone reference repository 234 comprising a file structure representation of preferences located in the preference server database (e.g., a DB2 database associated with preference server 220). Once clone reference repository 234 has been created, it may be copied as master reference repository 236 and then downloaded to systems 20 as discussed in more detail below. Reference repositories 234 and 236 may be formatted according to a standardized format used by the file version management technology implemented in the system. As an example, reference repositories 234 and 236 may be Git repositories in systems implementing Git file version management technology.

After creating the initial reference repositories 234 and 236, update service 232 may periodically update the reference repositories 234 and 236. For example, update service 232 may periodically poll preference server 220 to obtain all active preferences including current preferences (including current certificates) associated with recipient system 20B. Polling may occur at a configurable, pre-determined time interval, such as once every 1 minute, every 2 minutes, every 5 minutes, every 10 minutes, or other suitable time interval. Update service 232 generates clone reference repository 234 by copying master reference repository 236 into a working copy that can be edited by update service 232. The working copy includes previous preferences including preferences that have been previously distributed to systems 20. Update service 232 compares each of the active preferences to the previous preferences to determine differences. For example, update service 232 may determine that recipient system 20B's current preferences are missing from clone reference repository 234. Update service 232 then updates clone reference repository 234 by adding current preferences associated with recipient system 20B.

As discussed above, the current preferences may include one or more certificates associated with recipient system 20B. Update service 232 may validate the signature of the certificate. If the certificate does not pass validation, the certificate will not be part of the set of certificates that are analyzed to update clone reference repository 234. If the certificate passes validation, update service 232 may compare the hash of the certificate in current preferences to the hash of a corresponding certificate in previous preferences stored in clone reference repository 234. If the hash values are the same, no action will be taken because clone reference repository 234 already has an up-to-date certificate. If the hash values are different, update service 232 will replace the previous certificate with the current certificate. If the certificate does not exist in clone reference repository 234, update service 232 will add it. If clone reference repository 234 contains certificates that are not in the preference server database, update service 232 will delete them from clone reference repository 234.

After update service 232 has made all of the changes to clone reference repository 234, update service 232 may create a commit and signature tag that can eventually be checked by systems 20 to ensure changes to preferences going to systems 20 have not been tampered with. Update service 232 then communicates/copies clone reference repository 234 to master reference repository 236 so that master reference repository 236 has the current state of preferences for the entire system. Either a pull method or, in the alternative, a push method may be used to communicate clone reference repository 234.

Download module 240 facilitates downloading changes from update module 230 to sending system 20A and other systems 20 configured to receive preferences from delivery manager 30. For example, download module 240 may pull changes contained in master reference repository 236 into a slave reference repository 242 so that slave reference repository 242 becomes a mirror image of master reference repository 236. The changes may include the additions/modifications according to current preferences. Download module 240 may pull the changes (without having to pull unchanged data) at a configurable, pre-determined time interval, such as once every 1 minute, every 2 minutes, every 5 minutes, every 10 minutes, or other suitable time interval.

Download module 240 accepts and authenticates requests from systems 20 to update the preferences. For example, a system 20 may download and store preferences in a preference repository 260 residing in local memory of system 20. In some embodiments, download module 240 may comprise a Java-based web application running in delivery manager 30 (e.g., a data center) that utilizes a distributed file version management technology, such as Git, J/Git, Subversion, Concurrent Versions System (CVS), or ClearCase, to manage the version of the preference that gets distributed to and stored in preference repository 260 of sending system 20A. The web application may run inside a Tomcat Servlet container with Apache. Download module 240 may be associated with a Uniform Resource Locator (URL) that systems 20 access using a Hypertext Transfer Protocol Secure (HTTPS) call. In some embodiments, the HTTPS call will be received by a load balancer 250 between sending system 20A and download module 240. The load balancer 250 may provide load distribution and disaster recovery. Sending system 20A may call download module 240 at a configurable, pre-determined time interval, such as once every 1 minute, every 2 minutes, every 5 minutes, every 10 minutes, or other suitable time interval.

Sending system 20A calls download module 240 to retrieve current preference and any other changes from slave reference repository 242 (e.g., a repository formatted according to a standardized format that corresponds to the file version management technology implemented in the system, such as a Git respository, J/Git repository, Subversion repository, Concurrent Versions System (CVS) repository, or ClearCase repository). As discussed above, in some embodiments, preferences may include one or more certificates that recipient system 20B would like sending system 20A to use when sending messages 105 to recipient system 20B. In some embodiments, sending system 20A may download current preferences to public bare repository 262. Sending system 20A may use public bare repository 262 to update preferences and to validate the signature tag before committing the changes. Once the updates and validation are complete, public bare repository 262 may be copied (e.g., using a push or pull method) to public clone repository 264. Sending system 20A may access public clone repository 264 to obtain preferences in the future when it needs to send a message to recipient system 20B. Thus, preferences may be available to sending system 20A in advance. As a result, sending system 20A can apply per message preferences without having to wait until the time it begins processing the message to get the preferences from delivery manager 30 (or another remote resource).

In some embodiments, sending system 20A can have a sending policy indicating how to apply recipient preferences. For example, even if sending system 20A and recipient system 20B support encryption, the policy may instruct sending system 20A not to perform encryption in certain circumstances. As sending system 20A processes a new message, sending system 20A may apply the policy that determines whether or not to encrypt the data. The policy may define encryption decisions based on the identity of the recipient, the sensitivity of the message, or other criteria.

Although the preceding example describes distributing public keys from a sending system 20A to a recipient system 20B, analogous methods may be used to distribute preferences between any suitable components of system 5. As an example, file version management technology may be used within a private network to distribute private keys or other local preferences from a managing gateway 28a to a redundant gateway 28a'. The redundant gateway 28a' may be located within the same private network and may provide load balancing, disaster recovery, or other redundancy functionality for the managing gateway 28a. Gateway manager 210a associated with managing gateway 28a may use file version management technology to distribute a private key to private clone repository 266 associated with redundant gateway 28a'. When the gateway manager 210a adds/deletes/modifies private clone repository 266, the changes can be committed to private bare repository 268. In some embodiments, changes can be made to private clone repository 266 without having to validate a signature. This is because the private key originates from and is maintained within the private network and is therefore less likely to have been tampered with. The redundant gateway 28a' may then retrieve the up-to-date private keys from private clone repository 266, for example, when it needs to decrypt messages.

FIG. 3 illustrates an example of components of the system that may facilitate obtaining a certificate from DNS, according to certain embodiments. FIG. 3 illustrates a system 20, delivery manager 30, and DNS 40 similar to those described above with respect to FIGS. 1-2. In certain embodiments, system 20 may comprise a gateway or mail relay, and delivery manager 30 may comprise a data center. In FIG. 3, system 20 includes an encryption engine 320, a certificate cache 322 comprising a plurality of certificates (smime/A, smime/B, . . . smime/N), and a certificate download utility 324. Delivery manager 30 includes a certificate server 330, a certificate cache clone 332, and a certificate download utility 334.

Encryption engine 320 performs encryption functionality for system 20. For example, encryption engine 320 may receive an inbound message and may decrypt the inbound message based on a private key that encryption engine 320 maintains for system 20. As another example, encryption engine 320 may encrypt an outbound message using a public key of the recipient system to which the outbound message is addressed. To encrypt the outbound message, encryption engine 320 checks certificate cache 322 to determine whether system 20 has a certificate for recipient system. If so, encryption engine 320 may further check whether the certificate is valid and supports a desired encryption technique (e.g., based on security requirements of the outbound message). If encryption engine 320 determines that certificate cache 322 needs a certificate associated with the recipient system, encryption engine 320 may request the certificate from DNS 40. For example, in some embodiments, encryption engine 320 uses DANE protocol to request the certificate from DNS 40.

If DNS 40 has the requested certificate, DNS 40 provides a copy of the certificate to system 20. For purposes of example, suppose the requested certificate comprises "smime/X." After obtaining smime/X from DNS 40, encryption engine 320 uses smime/X to encrypt the outbound message and then sends the encrypted message for delivery to the recipient system. Encryption engine 320 also stores smime/X in certificate cache 322 and provides a copy of smime/X to delivery manager 30's certificate server 330.

Delivery manager 30's certificate server 330 adds the smime/X to certificate cache clone 332. Thus, smime/X becomes available to be distributed to other systems 20 via the certificate download utility 334. For example, in some embodiments, certificate download utility 334 may comprise a Java-based web application running inside a Tomcat Servlet container with Apache. Certificate download utility 334 may use a distributed file version management technology, such as Git, J/Git, Subversion, Concurrent Versions System (CVS), or ClearCase, to manage the version of the certificate that gets distributed to and stored in the various repositories of delivery manager 30 and systems 20.

In FIG. 3, system 20's certificate download utility 324 receives certificates from delivery manager 30's certificate download utility 334 and stores the certificates in certificate cache 322. In the example, the particular system 20 that already obtained smime/X from DNS 40, would not need to obtain smime/X from delivery manager 30. However, system 20 may obtain other certificates from delivery manager 30 (such as certificates that delivery manager 30 harvests from DNS 40 or receives from other systems 20).

FIG. 4 illustrates an example of components of the system that may facilitate harvesting a certificate from DNS, according to certain embodiments. FIG. 4 illustrates a system 20, delivery manager 30, and DNS 40 similar to those described above with respect to FIGS. 1-3. In certain embodiments, system 20 may comprise a gateway or mail relay, and delivery manager 30 may comprise a data center. In FIG. 4, system 20 includes a certificate cache 322 comprising a plurality of certificates (smime/A, smime/B, . . . smime/N) and a certificate download utility 324. Delivery manager 30 includes a certificate server 330, reporting data 344, certificate repository updater 350, and certificate download utility 334.

Certificate server 330 comprises a certificate database 340 and a certificate harvester 342. Certificate harvester 342 harvests certificates from DNS 40. In certain embodiments, certificate harvester 342 harvests certificates based on analyzing reporting data 344. For example, reporting data 344 may comprise logs, reports, statistics, etc. collected to monitor the performance of systems 20. Certain logs may be generated if system 20 sends a message, receives a message, sets up a transport layer connection, etc. Certificate harvester 342 may periodically review the data to determine whether it includes any errors or other information indicating to harvest a certificate from DNS 40. For example, if reporting data 344 indicates that a system 20 could not send an encrypted message to a recipient X (e.g., if reporting data 344 indicates that the message to recipient X was sent in plaintext or via secure portal 50), certificate harvester 342 determines to harvest that recipient X's certificate from DNS 40.

As another example, in certain embodiments, certificate harvester 342 determines to harvest certificates based on reviewing information from certificate database 340. For example, if certificate harvester 342 determines that a certificate that certificate database 340 maintains for recipient X is invalid, expired (or a about to expire), certificate harvester 342 may harvest a current/valid/updated certificate from DNS 40. Certificate harvester 342 may initiate harvesting certificates for any other suitable reason.

To harvest certificates, certificate harvester 342 sends a request to DNS 40. For example, in certain embodiments, certificate harvester 342 may use DANE protocol to request the certificate. Certificate harvester 342 may send requests on an as-needed basis or on a periodic basis. For example, certificate harvester 342 may periodically request batches of certificates to be updated. If DNS 40 has the requested certificate(s), DNS 40 provides the certificate(s) to certificate harvester 342.

Certificate harvester writes the certificates received from DNS 40 to certificate database 340 of certificate server 330. Certificate repository updater 350 may then obtain the certificates from certificate database 340. For example, certificate update service 352 within certificate repository updater 350 may receive current certificates from certificate server 330 and may interact with clone certificate cache repository 354 and master certificate cache repository 356 to facilitate distributing certificates to systems 20.

In some embodiments, certificate update service 352 may comprise a Java-based web application running inside a Tomcat Servlet container with Apache. Certificate update service 352 may use a distributed file version management technology, such as Git, J/Git, Subversion, Concurrent Versions System (CVS), or ClearCase, to manage the version of the certificate that gets distributed to and stored in the various repositories of delivery manager 30 and systems 20.

Initially, certificate update service 352 may create clone certificate cache repository 354 comprising a file structure representation of certificates located in certificate database 340 (e.g., a DB2 database associated with certificate server 330). Once clone certificate cache repository 354 has been created, it may be copied as master certificate cache repository 356 and then downloaded to systems 20. Repositories 354 and 356 may be formatted according to a standardized format used by the file version management technology implemented in the system. As an example, repositories 354 and 356 may be Git repositories in systems implementing Git file version management technology.

After creating the initial certificate repositories 354 and 356, certificate update service 352 may periodically update the repositories 354 and 356. For example, certificate update service 352 may periodically poll certificate server 330 to obtain all active certificates including current certificates. Polling may occur at a configurable, pre-determined time interval, such as once every 1 minute, every 2 minutes, every 5 minutes, every 10 minutes, or other suitable time interval. Certificate update service 352 generates clone certificate cache repository 354 by copying master certificate cache repository 356 into a working copy that can be edited by certificate update service 352. The working copy includes previous certificates including certificates that have been previously distributed to systems 20. Certificate update service 352 compares each of the active certificates to the previous certificates to determine differences. For example, certificate update services 352 may determine that recipient system. 20B's current certificates are missing from clone certificate cache repository 354. Certificate update service 352 then updates clone certificate cache repository 354 by adding current certificates associated with recipient system 20B.

Certificate update service 352 may validate the signature of the certificate. If the certificate does not pass validation, the certificate will not be part of the set of certificates that are analyzed to update done certificate cache repository 354. If the certificate passes validation, certificate update service 352 may compare the hash of the current certificate to the hash of a corresponding previous certificate stored in done certificate cache repository 354. If the hash values are the same, no action will be taken because clone certificate cache repository 354 already has an up-to-date certificate, if the hash values are different, certificate update service 352 will replace the previous certificate with the current certificate. If the certificate does not exist in clone certificate cache repository 354, certificate update service 352 will add it. If done certificate cache repository 354 contains certificates that are not in the certificate database 340 (e.g., because the certificates have expired or become certificate update service 352 will delete them from clone certificate cache repository 354.

After certificate update service 352 has made all of the changes to clone certificate cache repository 354, certificate update service 352 may create a commit and signature tag that can eventually be checked by systems 20 to ensure changes to certificates going to systems 20 have not been tampered with. Certificate update service 352 then communicates/copies clone certificate cache repository 354 to master certificate cache repository 356 so that master certificate cache repository 356 has the current state of certificates for the entire system. Either a pull method or, in the alternative, a push method may be used to communicate clone certificate cache repository 354.

Download module 334 facilitates downloading changes to systems 20 configured to receive certificates from delivery manager 30. For example, download module 334 may pull changes contained in master certificate cache done repository 356 into a slave repository 332 so that slave repository 332 becomes a mirror image of master certificate cache repository 356. The changes may include the added/updated certificates. Download module 334 may pull the changes (without having to pull unchanged data) at a configurable, pre-determined time interval, such as once every 1 minute, every 2 minutes, every 5 minutes, every 10 minutes, or other suitable time interval.

Download module 334 accepts and authenticates requests from systems 20 to update the certificates. For example, a system 20 may download and store certificates to certificate cache 322 residing in local memory of system 20. In some embodiments, download module 334 may comprise a Java-based web application running in delivery manager 30 (e.g., a data center) that utilizes a distributed file version management technology, such as Git, J/Git, Subversion, Concurrent Versions System (CVS), or ClearCase, to manage the version of the certificate that gets distributed to and stored in certificate cache 322 of sending system 20A. The web application may run inside a Tomcat Servlet container with Apache. Download module 334 may be associated with a Uniform Resource Locator (URL) that systems 20 access using a Hypertext Transfer Protocol Secure (HTTPS) call. In some embodiments, the HTTPS call will be received by a load balancer between sending system 20A and download module 334. The load balancer may provide load distribution and disaster recovery. Sending system 20A may call download module 334 at a configurable, pre-determined time interval, such as once every 1 minute, every 2 minutes, every 5 minutes, every 10 minutes, or other suitable time interval.

Sending system 20A may include a certificate download utility 324 configured to call download module 334 to retrieve current certificates from slave repository 332 (e.g., a repository formatted according to a standardized format that corresponds to the file version management technology implemented in the system, such as a Git repository, J/Git repository, Subversion repository, Concurrent Versions System (CVS) repository, or ClearCase repository). Once sending system 20A completes the updating and validation of the certificates, sending, system 20A may access certificate cache 322 to obtain certificates in the future when it needs to send a message to (or establish a transport layer connection with) recipient system 20B. Thus, certificates may be available to sending system 20A in advance. As a result, sending system 20A can apply per message certificates without having to wait until the time it begins processing, the message to get the certificates from delivery manager 30 (or another remote resource).

Figure 5:
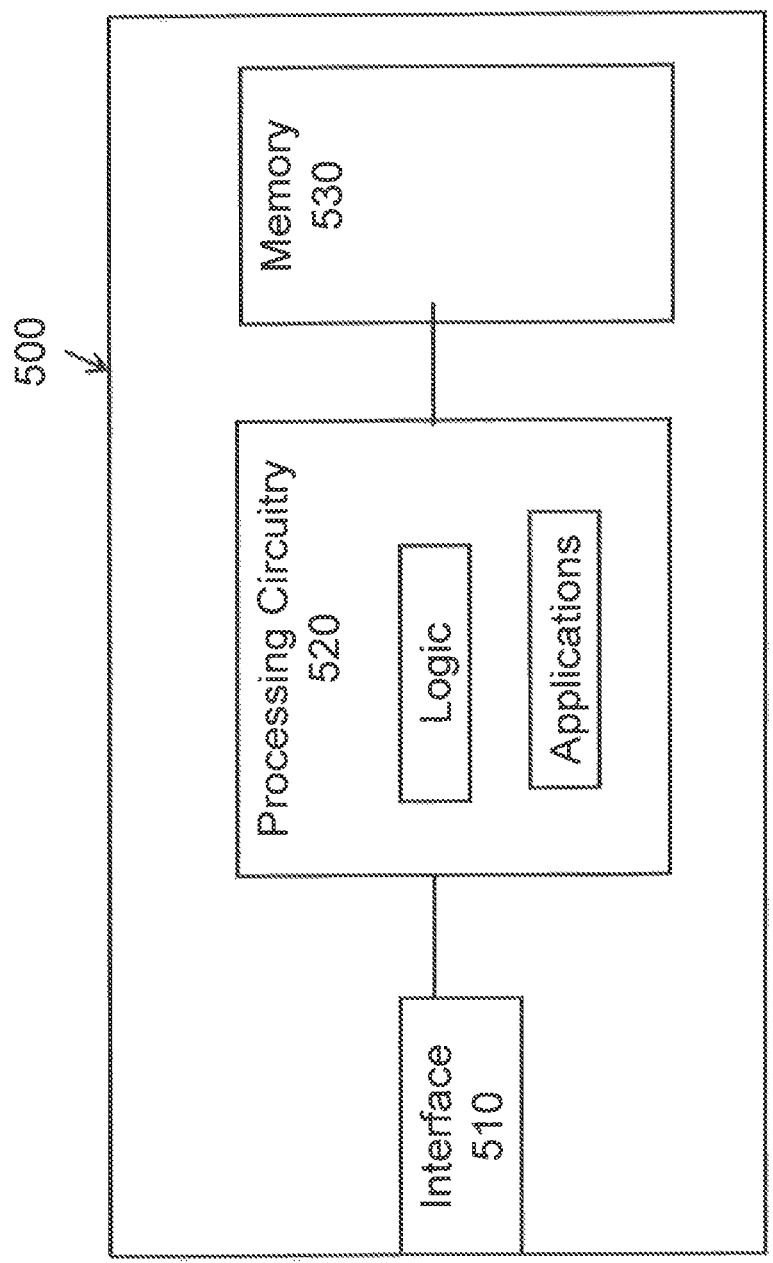
FIG. 5 illustrates an example of elements that may be included in the components described with respect to FIGS. 1-4, according to certain embodiments.

FIG. 5 illustrates an example of elements 500 that may be included in the systems and apparatuses disclosed herein. For example, any of network 10, systems 20, delivery manager 30, DNS 40, and/or secure portal 50 may include one or more interface(s) 510, processing circuitry 520, memory(ies) 530, and/or other suitable element(s), interface 510 receives input, sends output, processes the input and/or output, and/or performs other suitable operation. Interface 510 may comprise hardware and/or software.

Processing circuitry 520 performs or manages the operations of the component. Processing circuitry 520 may include hardware and/or software. Examples of a processing circuitry include one or more computers, one or more microprocessors, one or more applications, etc. In certain embodiments, processing circuitry 520 executes logic (e.g., instructions) to perform actions (e.g., operations), such as generating output from input. The logic executed by processing circuitry 520 may be encoded in one or more tangible, non-transitory computer readable media (such as memory 530). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 530 (or memory unit) stores information. Memory 530 may comprise one or more non-transitory, tangible, computer-readable, and/or computer-executable storage media. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Figure 6:
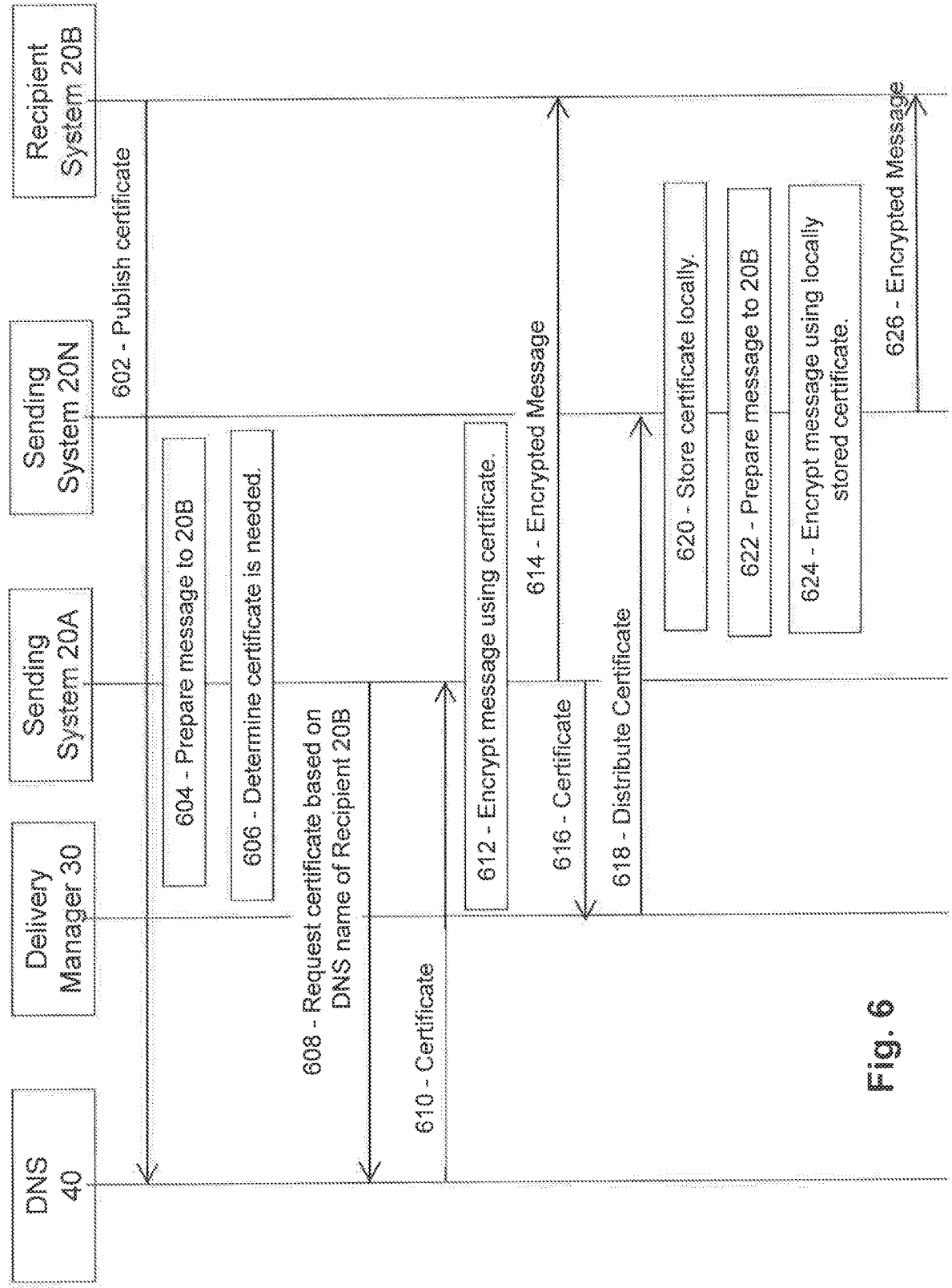
FIGS. 6-13 illustrate examples of methods for distribution of a certificate, according to certain embodiments.

FIG. 6 illustrates an example of a method for distribution of a certificate, according to certain embodiments. The method begins at step 602 where a recipient system 20B publishes its certificate (e.g., SMIME certificate) with DNS 40. As an example, recipient system 20B may use DANE protocol to publish its certificate with DNS 40. Recipient system 20B may determine to publish its certificate with DNS 40 in order to enable DNS 40 to provide the certificate to other systems 20 in response to future requests for the certificate.

At step 604, sending system 20A prepares a message to be sent to recipient system 20B, and at step 606 sending system 20A determines that recipient system 20B's certificate is needed to send the message. For example, sending system 20A determines that the certificate is needed if the message requires encryption and sending system 20A does not have a copy of recipient system 20B's certificate stored in local memory.

At step 608, sending system 20A requests recipient system 20B's certificate from DNS 40. The request uses recipient system 20B's DNS name to identify the certificate being requested. Examples of DNS names include domain names, fully qualified domain names, machine names, etc. In certain embodiments, the DNS name corresponds to an individual mail client, such as a user mail client with s/mime managed by a desktop email client. For example, the DNS name may be an email address of the user. In certain embodiments, the DNS name corresponds to a mail transfer agent. A mail transfer agent refers to an agent that handles email for an email domain. Examples of a mail transfer agent include a mail gateway or mail relay. In certain embodiments, the request may be configured according to DANE protocol.

At step 610, sending system 20A receives the certificate that DNS 40 associates with the DNS name of recipient system 20B. Sending system 20A obtains recipient system 20B's certificate from DNS 40 in real-time when sending the message to recipient system 20B for which sending system 20A does not have the certificate.

At step 612, sending system 20A uses recipient system 20B's certificate (i.e., the certificate received from DNS 40 in step 610) to encrypt the message, and at step 614 sending system 20A sends the encrypted message to recipient system 20B.

At step 616, sending system 20A provides recipient system 20B's certificate to delivery manager 30 for distribution to the other sending systems, such as sending system 20N. That is, in the embodiment of FIG. 6, delivery manager 30 receives the certificate that DNS 40 associates with the DNS name of recipient system 20B via sending system 20A.

At step 618, delivery manager 30 distributes recipient system 20B's certificate to a plurality of sending systems 20. In certain embodiments, the certificate is distributed to the sending systems using distributed file version management technology. In certain embodiments, the certificate is distributed to the plurality of sending systems according to a pre-determined time period. For example, delivery manager 30 may send updates to the sending systems at regular intervals based on the pre-determined time period. Alternatively, delivery manager 30 may send updates to the sending systems as delivery manager 30 receives new/updated certificates, without having to wait for the pre-determined time period. In certain embodiments, the certificate is made available to the plurality of sending systems concurrently.

In the illustration, the plurality of sending systems 20 include sending system 20N. Each sending system 20, such as sending system 20N, is configured to store recipient system 20B's certificate in its local memory (step 620), in response to a future determination to send an encrypted message to recipient system 20B (step 622) use recipient system 20B's certificate from local memory to perform encryption (step 624), and send the encrypted message directly to recipient system 20B (step 626).

Figure 7:
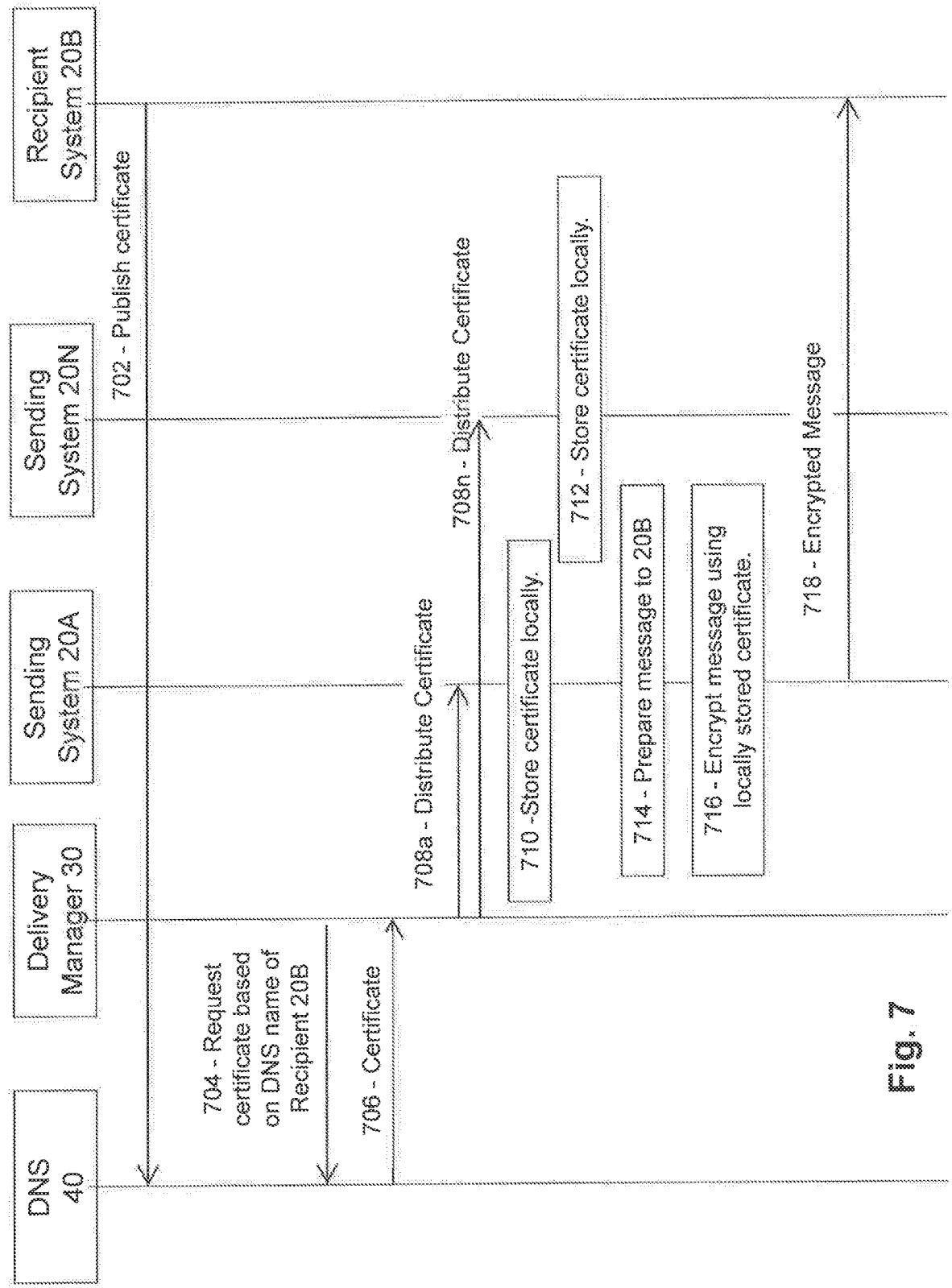

FIG. 7 illustrates another example of a method for distribution of a certificate, according to certain embodiments. The method begins at step 702 where a recipient system 20B publishes its certificate with DNS 40. As an example, recipient system 20B may use DANE protocol to publish its certificate with DNS 40. Recipient system 20B may determine to publish its certificate with DNS 40 in order to enable DNS 40 to provide the certificate to other systems 20 in response to future requests for the certificate.

At step 704, delivery manager 30 sends a request message to DNS 40. The request message requests the certificate associated with the DNS name of recipient system 20B. The DNS name of recipient system 20B may correspond to an individual mail client or a mail transfer agent. In certain embodiments, delivery manager 30 sends the request message as part of a discovery procedure, as further discussed below with respect to FIG. 8. In certain embodiments, delivery manager 30 sends the request message in response to determining that the certificate is needed by a sending system 20, for example, as further discussed below with respect to FIG. 9. In certain embodiments, the request is sent according to DANE protocol.

At step 706, delivery manager 30 receives the certificate that DNS 40 associates with the DNS name of recipient system 20B. In the example of FIG. 7, the certificate is received from DNS 40 as a result of sending the request message in step 704.

At step 708*a-n*, delivery manager 30 distributes recipient system 20B's certificate to a plurality of sending systems, such as sending systems 20A and 20N. In certain embodiments, the certificate is distributed to the sending systems using distributed file version management technology. In certain embodiments, the certificate is distributed to the plurality of sending systems according to a pre-determined time period. For example, delivery manager 30 may send updates to the sending systems at regular intervals based on the pre-determined time period. Alternatively, delivery manager 30 may send updates to the sending systems as delivery manager 30 receives new/updated certificates, without having to wait for the pre-determined time period. In certain embodiments, the certificate is made available to the plurality of sending systems concurrently.

Each sending system 20 is configured to store the certificate in local memory of the sending system (e.g., sending systems 20A and 20N store the certificate in steps 710 and 712, respectively), in response to a future determination to send an encrypted message to the recipient system (e.g., sending system 20A prepares a message in step 714), use the certificate from the local memory of the sending system to perform encryption (e.g., sending system 20A encrypts the message in step 716), and send the encrypted message directly to recipient system 20B (e.g., sending system 20A sends the message in step 718).

Figure 8:
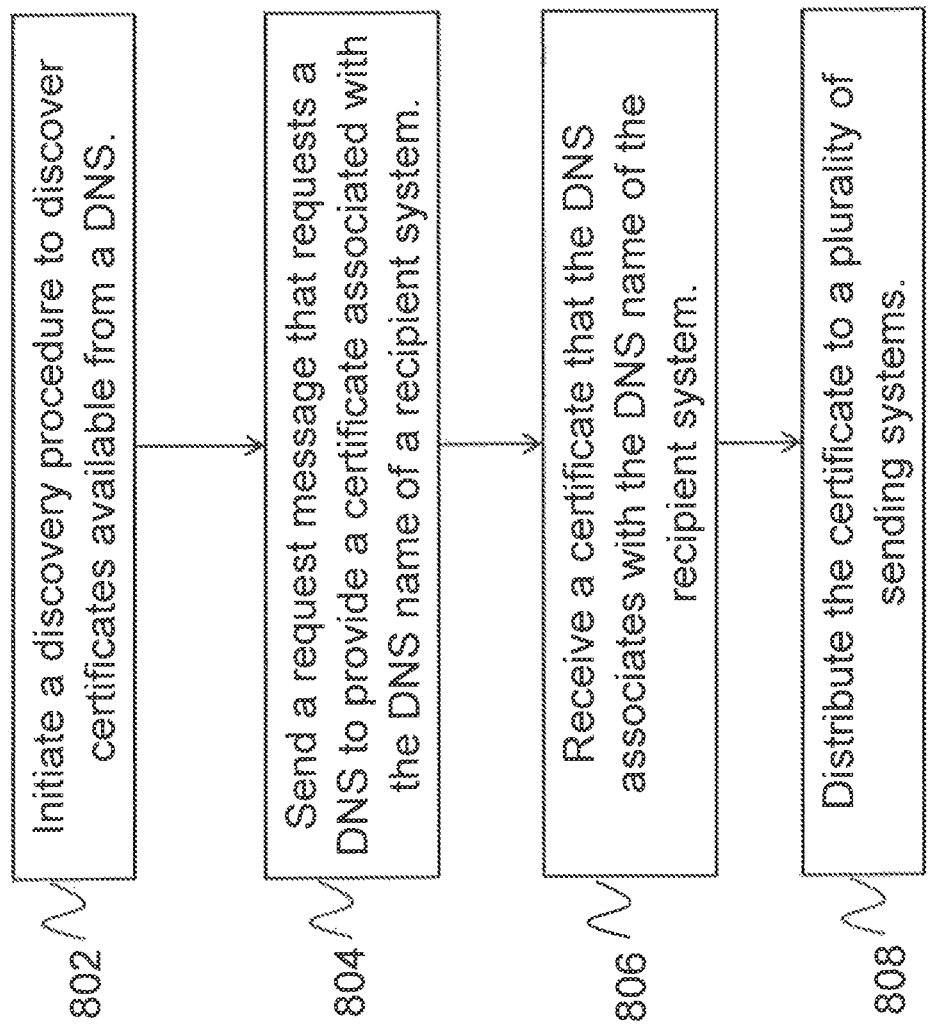

FIG. 8 illustrates another example of a method for distribution of a certificate, according to certain embodiments. In certain embodiments, the method may be performed by delivery manager 30. At step 802, delivery manager 30 initiates a discovery procedure in order to discover whether DNS 40 has a certificate (or an updated certificate) associated with recipient system 20B. As part of the discovery procedure, delivery manager 30 sends a request message to DNS 40 at step 804. The request message requests the certificate associated with the DNS name of the recipient system (e.g., similar to step 704 of FIG. 7). The discovery procedure can be initiated and the request message sent without requiring recipient system 20B (or the owner of recipient system 20B's DNS name) to inform delivery manager 30 that the certificate exists. For example, delivery manager 30 may automatically check whether DNS 40 has the certificate based on determining that one or more sending systems 20 have sent (or attempted to send) messages to recipient system 20B.

If DNS 40 has a certificate for recipient system 20B, DNS 40 provides the certificate in response to receiving the request message from delivery manager 30. At step 806, delivery manager 30 receives the certificate that DNS 40 associates with the DNS name of a recipient system (e.g., similar to step 706 of FIG. 7). At step 808, delivery manger 30 distributes the certificate to a plurality of sending systems 20 (e.g., similar to steps 708a-n in FIG. 7). Sending systems 20 may then store the certificate in local memory for future use.

Figure 9:
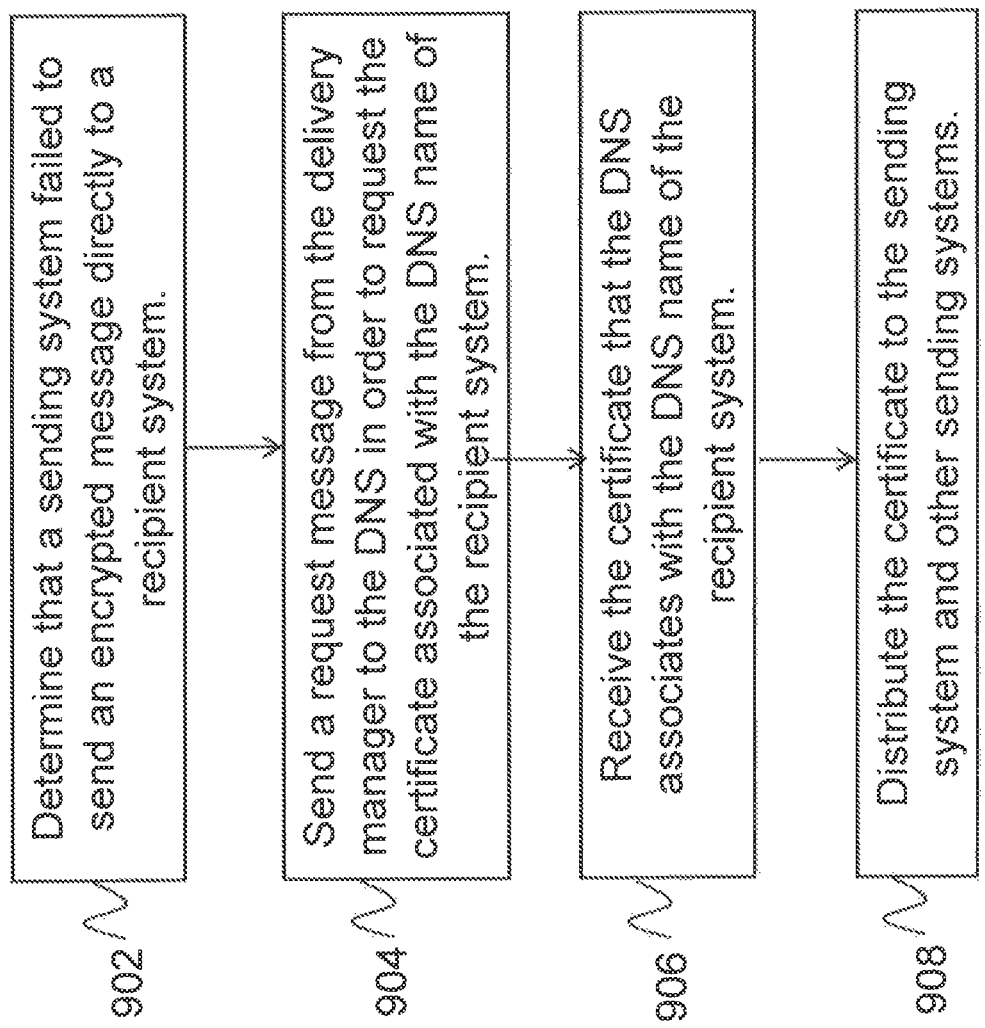

FIG. 9 illustrates another example of a method for distribution of a certificate, according to certain embodiments. In certain embodiments, the method may be performed by delivery manager 30. At step 902, delivery manger 30 determines that sending system 20A failed to send the encrypted message directly to recipient system 20B. In certain embodiments, the determination that sending system 20A failed to send the encrypted message directly to recipient system 20B is made based on data reported from sending system 20A. The data may comprise a notification from sending system 20 that it failed to encrypt the message. Alternatively, the data may comprise information from which delivery manager 30 can determine that sending system 20A failed to encrypt the message. As an example, if delivery manager 30 receives data indicating that the message from sending system 20A to recipient system 20B was sent in plain text (i.e., unencrypted) or was sent indirectly via secure portal 50, delivery manager 30 infers that sending system 20A failed to send the encrypted message directly to recipient system 20B.

At step 904, in response to determining that sending system 20A failed to send the encrypted message directly to recipient system 20B, delivery manager 30 sends a request message to DNS 40. The request message requests the certificate associated with the DNS name of recipient system 20B (e.g., similar to step 704 of FIG. 7). In certain embodiments, sending the request of step 904 is part of a harvesting procedure in which delivery manager 30 periodically reviews data reported from the plurality of sending systems 20 according to a configured periodicity (such as every 5 minutes, 1 hour, 1 day, 1 week, or other suitable periodicity), determines each instance in which any one of the sending systems 20 failed to send an encrypted message directly to any one of the recipient systems 20, and if delivery manager 30 does not already have the certificates of the recipient system 20 available to distribute, harvests the certificates from DNS 40 (e.g., by sending the request message of step 904).

If DNS 40 has a certificate for recipient system 20B, DNS 40 provides the certificate in response to receiving the request message from delivery manager 30. At step 906, delivery manager 30 receives the certificate that DNS 40 associates with the DNS name of a recipient system (e.g., similar to step 706 of FIG. 7). At step 908, delivery manger 30 distributes the certificate to a plurality of sending systems 20 (e.g., similar to steps 708a-n in FIG. 7). Sending systems 20 may then store the certificate in local memory for future use.

Although the method of FIG. 9 has been described as being performed by delivery manager 30, in other embodiments, the method of FIG. 9 could be performed by the sending system 20A itself. For example, if sending system 20A determines that it is unable to send an encrypted message directly to recipient system 20B, sending system 20A may request the certificate from DNS 40, obtain the certificate from DNS 40, and provide the certificate to delivery manger 30 for distribution to other sending systems.

Figure 10:
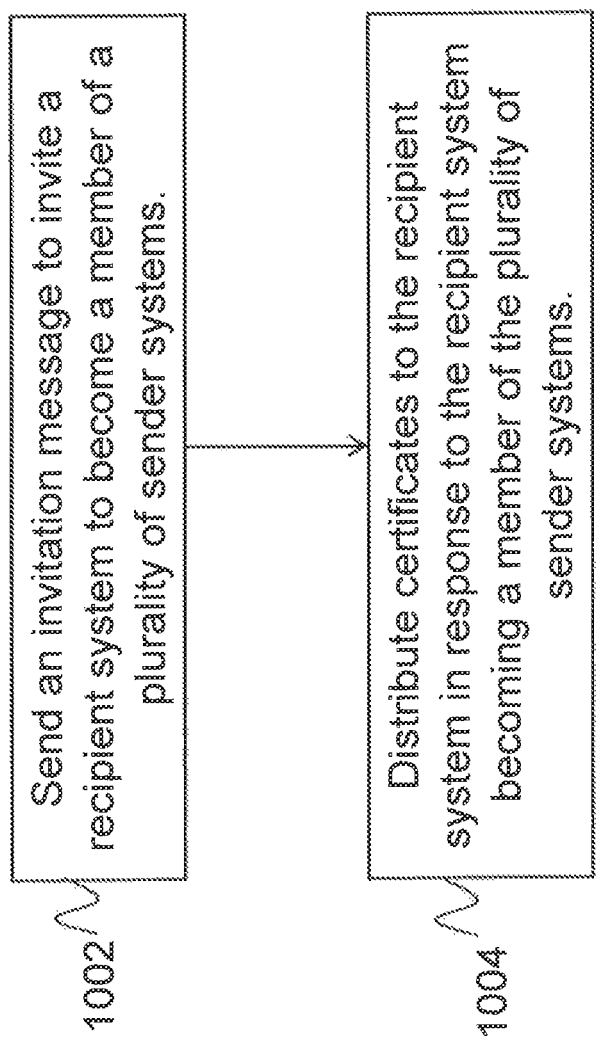

FIG. 10 illustrates another example of a method for distribution of a certificate, according to certain embodiments. In certain embodiments, the method may be performed by delivery manager 30. At step 1002, delivery manger 30 sends an invitation message to recipient system 20B. In certain embodiments, the invitation is considered to have been sent to recipient system 20B if the invitation is directed to the owner of the DNS name associated with recipient systems 20B. The invitation message invites recipient system 20B to become a member of the plurality of sender systems. By becoming a member of the sender systems, recipient system 20B can act as a sending system and send encrypted messages to other recipient systems (e.g., as discussed above a system 20 can be configured as a sending system, a recipient system, or both).

At step 1004, in response to recipient system 20B accepting the invitation and becoming a member of the plurality of sender systems, delivery manager 30 distributes certificates of other recipient systems to recipient/sending system 20B. Recipient/sending system 20B stores the certificates in local memory so that it can use the certificates in the future to send encrypted messages directly to the other recipient systems.

Figure 11:
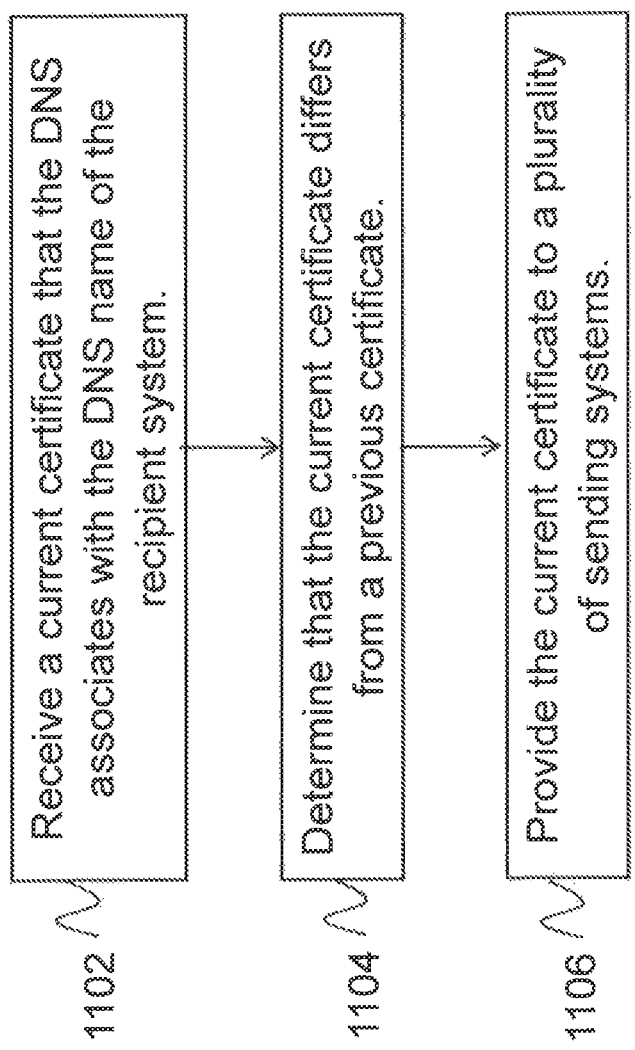

FIG. 11 illustrates another example of a method for distribution of a certificate, according to certain embodiments. In certain embodiments, the method may be performed by delivery manager 30. At step 1102, delivery manager 30 receives a current certificate that DNS 40 associates with the DNS name of recipient system 20B. For example, the current certificate is obtained by periodically sending request messages to DNS 40 according to a configured periodicity (such as every 5 minutes, 1 hour, 1 day, 1 week or other suitable periodicity). The request messages request the current certificate associated with the DNS name of recipient system 20B.

At step 1104, delivery manager 30 determines that the current certificate differs from the previous certificate. The previous certificate may refer to the version of recipient system 20B's certificate that delivery manager 30 has previously stored in its certificate repository for distribution to sending systems 20.

At step 1106, delivery manager 30 distributes the current certificate to the plurality of sending systems 20. Delivery manager 30 may also instruct the sending systems 20 to delete the previous key if the current certificate is supposed to replace the previous key (it is also possible to keep both keys so that different keys can be used for different purposes).

For purposes of example, the methods of FIGS. 6-11 have been described in the context of using a certificate to encrypt a message. Certain embodiments perform analogous methods in the context of using a certificate to establish a transport layer security (TLS) for a connection. For example, mail gateways can communicate at transport level, and certain embodiments use DANE protocol or other protocol to obtain certificates for establishing trust between two endpoints. That is, the cache can be extended to include transport layer certificates that can be applied to connections between mail gateways (regardless of whether or not S/MIME certificates are applied at the higher layer).

Figure 12:
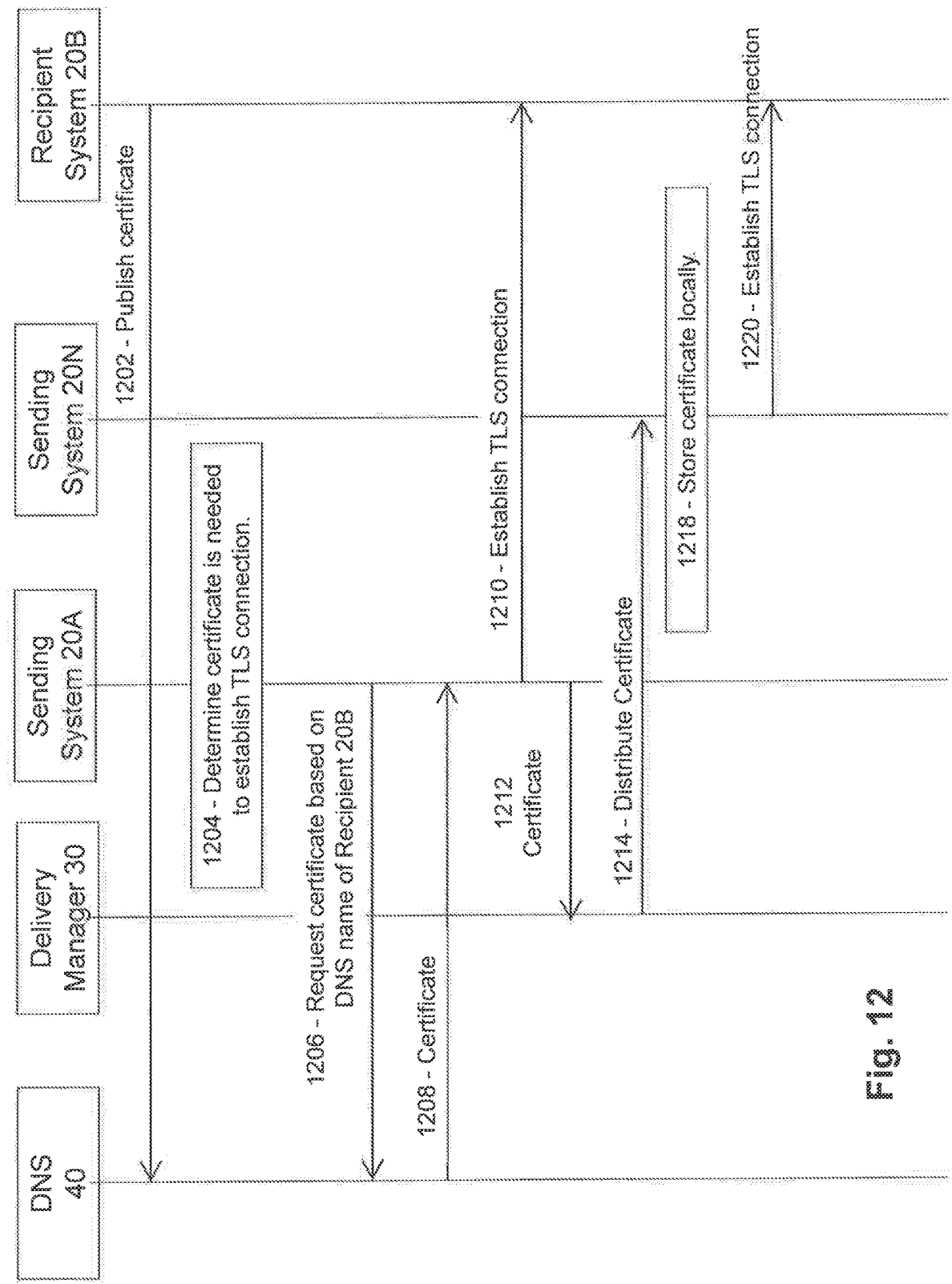
Figure 13:
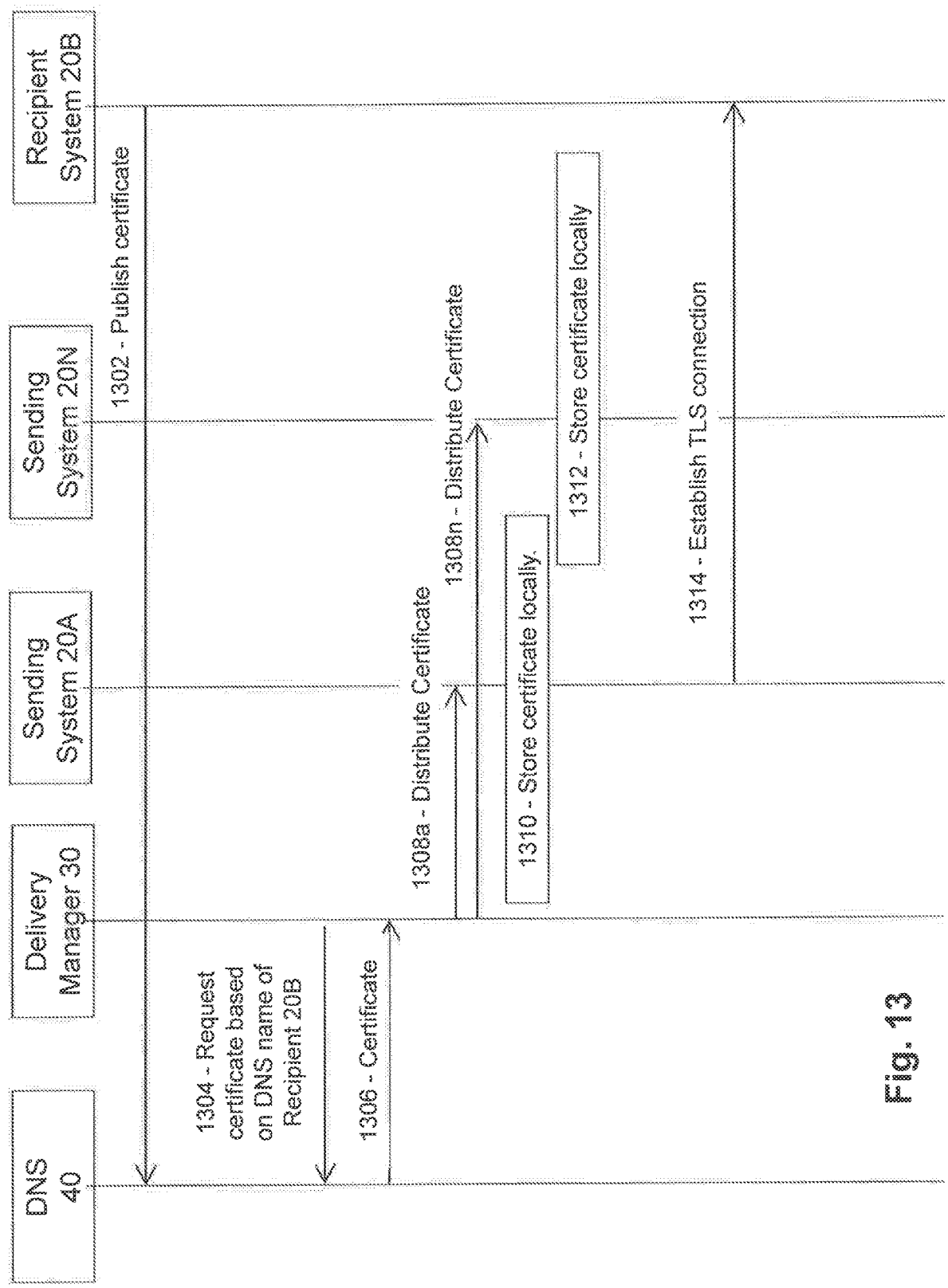

FIGS. 12-43 provide examples of methods for distributing TLS certificates, according to certain embodiments. FIGS. 12-13 are generally analogous to FIGS. 6-7, respectively. The methods may be performed to communicate a TLS certificate associated with an endpoint. An endpoint may refer to any system (or component thereof) configured to establish a TLS connection with another endpoint. For simplicity, FIGS. 12-13 illustrate a first endpoint as sending system 20A, a second endpoint as recipient system 20B, and another endpoint as sending system 20N. In certain embodiments, the endpoints may comprise mail gateways 28 within systems 20.

The method of FIG. 12 begins at step 1202 where a recipient system 20B publishes its TLS certificate with DNS 40. As an example, recipient system 20B may use DANE protocol to publish its certificate with DNS 40. Recipient system 20B may determine to publish its certificate with DNS 40 in order to enable DNS 40 to provide the certificate to other systems 20 in response to future requests for the certificate.

At step 1204, sending system 20A determines a certificate is needed to establish a TLS connection with recipient system 20B. For example, sending system 20A determines that the certificate is needed if the connection requires transport layer security and sending system 20A does not have a copy of recipient system 20B's TLS certificate stored in local memory.

At step 1206, sending system 20A requests recipient system 20B's TLS certificate from DNS 40. The request uses recipient system 20B's DNS name to identify the certificate being requested. Examples of DNS names include domain names, fully qualified domain names, machine names, etc. In certain embodiments, the request may be configured according to DANE protocol.

At step 1208, sending system 20A receives the TLS certificate that DNS 40 associates with the DNS name of recipient system 20B. Sending system 20A obtains recipient system 20B's TLS certificate from DNS 40 in real-time when establishing a transport layer connection to recipient system 20B for which sending system 20A does not have the certificate.

At step 1210, sending system 20A uses recipient system 20B's TLS certificate (i.e., the certificate received from DNS 40 in step 1208) to establish a TLS connection with recipient system 20B.

At step 1212, sending system 20A provides recipient system 20B's TLS certificate to delivery manager 30 for distribution to the other sending systems, such as sending system 20N. That is, in the embodiment of FIG. 12, delivery manager 30 receives the TLS certificate that DNS 40 associates with the DNS name of recipient system 20B via sending system 20A.

At step 1214, delivery manager 30 distributes recipient system. 20B's certificate to a plurality of sending systems 20. In certain embodiments, the certificate is distributed to the sending systems using distributed file version management technology. In certain embodiments, the certificate is distributed to the plurality of sending systems according to a predetermined time period. For example, delivery manager 30 may send updates to the sending systems at regular intervals based on the pre-determined time period. Alternatively, delivery manager 30 may send updates to the sending systems as delivery manager 30 receives new/updated certificates, without having to wait for the pre-determined time period. In certain embodiments, the certificate is made available to the plurality of sending systems concurrently.

In the illustration, the plurality of sending systems 20 include sending system 20N. Each sending system 20, such as sending system 20N, is configured to store recipient system 20B's certificate in its local memory (step 1218) and, in response to a future determination to establish a TLS connection with recipient system 20B, use recipient system 20B's TLS certificate from local memory to establish the TLS connection (step 1220).

FIG. 13 illustrates another example of a method for distribution of a certificate, according to certain embodiments. The method begins at step 1302 where a recipient system 20B publishes its TLS certificate with DNS 40. As an example, recipient system 20B may use DANE protocol to publish its TLS certificate with DNS 40. Recipient system 20B may determine to publish its TLS certificate with DNS 40 in order to enable DNS 40 to provide the TLS certificate to other systems 20 in response to future requests for the TLS certificate.

At step 1304, delivery manager 30 sends a request message to DNS 40. The request message requests the TLS certificate associated with the DNS name of recipient system 20B. As examples, delivery manager 30 may send the request message as part of a discovery procedure or in response to determining that the certificate is needed by a sending system 20. In certain embodiments, the request is sent according to DANE protocol.

At step 1306, delivery manager 30 receives the TLS certificate that DNS 40 associates with the DNS name of recipient system 20B. In the example of FIG. 13, the certificate is received from DNS 40 as a result of sending the request message in step 1304.

At step 1308a-n, delivery manager 30 distributes recipient system 20B's TLS certificate to a plurality of sending systems, such as sending systems 20A and 20N. In certain embodiments, the TLS certificate is distributed to the sending systems using distributed file version management technology. In certain embodiments, the certificate is distributed to the plurality of sending systems according to a pre-determined time period. For example, delivery manager 30 may send updates to the sending systems at regular intervals based on the pre-determined time period. Alternatively, delivery manager 30 may send updates to the sending systems as delivery manager 30 receives new/updated certificates, without having to wait for the pre-determined time period. In certain embodiments, the certificate is made available to the plurality of sending systems concurrently.

Each sending system 20 is configured to store the certificate in local memory of the sending system (e.g., sending systems 20A and 20N store the certificate in steps 1310 and 1312, respectively) and, in response to a future determination to establish a TLS connection with the recipient system 20B, use the certificate from the local memory of the sending system to establish a TLS connection (e.g., sending system 20A uses the TLS certificate to establish a TLS connection in step 1314).

Methods analogous to those described with respect to FIG. 8 may be applied to embodiments that encompass distribution of TLS certificates. For example, delivery manager 30 may initiate a discovery procedure in order to discover whether DNS 40 has a certificate (or an updated certificate) associated with an endpoint for a TLS connection. As part of the discovery procedure, delivery manager 30 sends a request message to DNS 40. The request message requests the certificate associated with the DNS name of the endpoint. The discovery procedure can be initiated and the request message sent without requiring the owner of the endpoint to inform delivery manager 30 that the certificate exists. For example, delivery manager 30 may automatically check whether DNS 40 has the certificate based on determining that another endpoint has established (or attempted to establish) a TLS connection with the endpoint. If DNS 40 has a certificate for the endpoint, DNS 40 provides the certificate in response to receiving the request message from delivery manager 30. Delivery manager 30 receives the certificate that DNS 40 associates with the DNS name of the endpoint. Delivery manger 30 distributes the certificate to other endpoints which may then store the certificate in local memory for future use.

Methods analogous to those described with respect to FIG. 9 may be applied to embodiments that encompass distribution of TLS certificates. For example, if delivery manger 30 determines that two endpoints failed to establish TLS for a connection, delivery manager 30 sends a request message to DNS 40. The request message requests the certificate associated with the DNS name of the endpoint whose certificate is needed to establish TLS. The request can be sent as part of a harvesting procedure in which delivery manager 30 periodically reviews data reported from the plurality of endpoints, determines each instance in which any one of the endpoints failed to establish TLS, and if delivery manager 30 does not already have the certificates required for those endpoints to establish TLS, harvests the certificates from DNS 40 (e.g., by sending the request message to DNS 40).

If DNS 40 has a certificate for the requested endpoint, DNS 40 provides the certificate in response to receiving the request message from delivery manager 30. Delivery manager 30 receives the certificate that DNS 40 associates with the DNS name of the endpoint and distributes the certificate to the other endpoints to be stored in local memory for future use.

Although the previous example has been described as being performed by delivery manager 30, in other embodiments, the method could be performed by an endpoint itself. For example, if a first endpoint determines that it is unable to establish a TLS connection with a second endpoint, the first endpoint may request the certificate from DNS 40, obtain the certificate from DNS 40, and provide the certificate to delivery manger 30 for distribution to other endpoints.

Methods analogous to those described with respect to FIG. 10 may be applied to embodiments that encompass distribution of TLS certificates. For example, delivery manager 30 may send an invitation message to an endpoint. In certain embodiments, the invitation is considered to have been sent to the endpoint if the invitation is directed to the owner of the DNS name associated with the endpoint. The invitation message invites the endpoint to become a member of a system of endpoints. By becoming a member, the invited endpoint can obtain certificates from delivery manager 30 in order to establish TLS connections with other endpoints in the system. In response to the invited endpoint accepting the invitation and becoming a member of the system of endpoints, delivery manager 30 distributes certificates of other endpoints. The endpoint stores the certificates in local memory so that it can use the certificates in the future to establish TLS connections with the other endpoints.

Methods analogous to those described with respect to FIG. 11 may be applied to embodiments that encompass distribution of TLS certificates. For example, delivery manager 30 receives a current TLS certificate that DNS 40 associates with the DNS name of an endpoint. For example, the current certificate is obtained by periodically sending request messages to DNS 40 according to a configured periodicity (such as every 5 minutes, 1 hour, 1 day, 1 week or other suitable periodicity). The request messages request the current certificate associated with the DNS name of the endpoint.

Delivery manager 30 receives the current TLS certificate from DNS 40 and determines that the current TLS certificate differs from the previous TLS certificate. The previous TLS certificate may refer to the version of an endpoint's certificate that delivery manager 30 has previously stored in its certificate repository for distribution to other endpoints. In response, delivery manager 30 distributes the current TLS certificate to the plurality of endpoints. Delivery manager 30 may also instruct the other endpoints to delete the previous TLS certificate if the current TLS certificate is supposed to replace the previous TLS certificate (it is also possible to keep both TLS certificates so that different certificates can be used for different purposes).

In any of the above-described embodiments, if delivery manager 30 determines that there is a problem with recipient system 20B's certificate provided by DNS 40 (e.g., S/MIME TLS certificate), delivery manager 40 may notify recipient system 20B that there is a problem. For example, delivery manager 30 may notify recipient system 20B if the certificate has expired, has an untrusted signature, or has any other error. In certain embodiments, the notification is considered to have been sent to recipient system 20B if the notification is directed to the owner of the DNS name associated with recipient systems 20B.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Some embodiments of the disclosure may provide one or more technical advantages. A technical advantage of certain embodiments may be the efficient management of recipient preferences within a network. For example, recipient preferences may be distributed to senders and stored in local memory associated with each sender. When a sender needs to transmit data to a recipient, the sender can use the recipient preferences stored in local memory without having to ask a remote resource, such as a central server or the recipient itself, for the preferences. Thus, certain embodiments may reduce or eliminate latencies and/or bandwidth penalties associated with having to ask a remote resource for recipient preferences each time the sender needs to transmit data. Additionally, storing recipient preferences in local memory may allow the sender to access and apply the preferences during a temporary absence of the remote resource.

In some embodiments, efficient management of recipient preferences may facilitate an 'encrypt-if-you-can' sending feature. According to the feature, the sender checks the recipient preferences stored in local memory to see if the recipient is advertising decryption capability. If the recipient preferences indicate that the recipient is willing and able to decrypt data, the sender can encrypt messages to the recipient on an opportunistic basis in the interest of benevolent privacy protection. Without a local store of the recipient preferences, execution of this feature may necessitate some network query to a central resource for every message sent. Such per-message demands can result in the consumption of more internet access bandwidth for policy execution than that required to ultimately transmit the message. The combined effect of such bandwidth demands on the central resource charged with making the data available globally could materially impact the cost and availability characteristics of the entire service.

Additional examples of technical advantages are discussed above in the summary section.

Some embodiments may benefit from some, none, or all of these advantages. Other technical advantages may be readily ascertained by one of ordinary skill in the art.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method for use in a delivery manager, the method comprising:
   Receiving, at a delivery manager, from a first sending system of a plurality of sending systems, a certificate that a Domain Name Service (DNS) associates with a DNS name of a recipient system;
   distributing the certificate to the plurality of sending systems in response to the delivery manager receiving the certificate, each sending system configured to:
   store the certificate in a local memory of the sending system;
   in response to a future determination to send an encrypted message to the recipient system, use the certificate from the local memory of the sending system to perform encryption; and
   send the encrypted message directly to the recipient system; and
   the first sending system configured to:
   obtain the certificate from the DNS in real-time when sending a message to the recipient system for which the first sending system does not have the certificate; and
   provide the certificate to the delivery manager for distribution to the other sending systems.

2. A system, comprising:
   a delivery manager and a plurality of sending systems, the delivery manager comprising:
   an interface configured to receive, from a first sending system of the plurality of sending systems, a certificate that a Domain Name Service (DNS) associates with a DNS name of a recipient system; and
   processing circuitry configured to distribute the certificate to the plurality of sending systems in response to the delivery manager receiving a new or updated certificate;
   wherein each sending system is configured to:
   store the certificate in a local memory of the sending system;
   in response to a future determination to send an encrypted message to the recipient system, use the certificate from the local memory of the sending system to perform encryption; and
   send the encrypted message directly to the recipient system; and
   the first sending system configured to:
   obtain the certificate from the DNS in real-time when sending a message to the recipient system for which the first sending system does not have the certificate; and
   provide the certificate to the delivery manager for distribution to the other sending systems.

3. The system of claim 2, wherein the DNS name of the recipient system corresponds to an individual mail client.

4. The system of claim 2, wherein the DNS name of the recipient system corresponds to a mail transfer agent.

5. The system of claim 2, the processing circuitry further configured to:
   send a request message from the delivery manager to the DNS, wherein the request message requests the certificate associated with the DNS name of the recipient system; and
   wherein the interface receives the certificate as a result of the processing circuitry sending the request message.

6. The system of claim 5, wherein the request message is sent according to DNS-based Authentication of Named Entities (DANE) protocol.

7. The system of claim 5, wherein the processing circuitry is further configured to initiate a discovery procedure such that the request message is sent to the DNS without requiring the recipient system to inform the delivery manager that the certificate exists.

8. The system of claim 5, wherein the processing circuitry is configured to send the request message in response to a determination that the sending system failed to send the encrypted message directly to the recipient system.

9. The system of claim 8, wherein the determination that the sending system failed to send the encrypted message directly to the recipient system is made based on data reported from the sending system.

10. The system of claim 2, the processing circuitry further configured to notify the recipient system in response to the delivery manager determining that there is a problem with the certificate received from the DNS.

11. The system of claim 2, the processing circuitry further configured to:
    send an invitation message to the recipient system, wherein the invitation message invites the recipient system to become a member of the plurality of sender systems.

12. The system of claim 11, wherein the delivery manager further comprises a certificate repository comprising other certificates associated with other recipient systems, and wherein, in response to the recipient system becoming a member of the plurality of sender systems, the processing circuitry is further configured to distribute the other certificates to the recipient system.

13. The system of claim 2, the processing circuitry further configured to:
    receive a current certificate that the DNS associates with the DNS name of the recipient system;
    determine that the current certificate differs from the previous certificate; and
    distribute the current certificate to the plurality of sending systems.

14. The system of claim 13, wherein the processing circuitry is further configured to periodically send request messages to the DNS, wherein the request messages request the current certificate associated with the DNS name of the recipient system, and the current certificate is obtained as a result of periodically sending the request messages to the DNS.

15. The system of claim 2, wherein the processing circuitry is configured to distribute the certificate to the plurality of sending systems according to regular intervals.

16. The system of claim 2, wherein the certificate comprises one or more of: a key identifier, a public key, information about a version, and a signature.

17. The system of claim 2, wherein the processing circuitry is configured to make the certificate available to the plurality of sending systems concurrently without having to wait until a time when each respective sending system begins processing that requires the certificate.

18. The system of claim 2, wherein the processing circuitry is configured to use distributed file version management technology to distribute the certificate to the sending systems.

19. A non-transitory computer readable medium storing logic that, when executed by processing circuitry of a delivery manager, is operable to cause the delivery manager to perform actions comprising:

receiving, at a delivery manager, from a first sending system of a plurality of sending systems, a certificate that a Domain Name Service (DNS) associates with a DNS name of a recipient system;

distributing the certificate to the plurality of sending systems in response to the delivery manager receiving the certificate, each sending system configured to:

store the certificate in a local memory of the sending system;

in response to a future determination to send an encrypted message to the recipient system, use the certificate from the local memory of the sending system to perform encryption; and send the encrypted message directly to the recipient system; and wherein, the first sending system is configured to:

obtain the certificate from the DNS in real-time when sending a message to the recipient system for which the first sending system does not have the certificate; and provide the certificate to the delivery manager for distribution to the other sending systems.

* * * * *